(12) United States Patent
Mahecha-Botero et al.

(10) Patent No.: US 10,350,543 B2
(45) Date of Patent: Jul. 16, 2019

(54) GAS TREATMENT PROCESS AND APPARATUS

(71) Applicant: NORAM ENGINEERING AND CONSTRUCTORS LTD., Vancouver (CA)

(72) Inventors: Andrés Mahecha-Botero, Vancouver (CA); Xuantian Li, Richmond (CA)

(73) Assignee: NORAM Engineering and Constructors Ltd., Vancouver (CA)

( * ) Notice: Subject to any disclaimer, the term of this patent is extended or adjusted under 35 U.S.C. 154(b) by 77 days.

(21) Appl. No.: 15/503,208

(22) PCT Filed: Aug. 12, 2015

(86) PCT No.: PCT/CA2015/050762
§ 371 (c)(1),
(2) Date: Feb. 10, 2017

(87) PCT Pub. No.: WO2016/023121
PCT Pub. Date: Feb. 18, 2016

(65) Prior Publication Data
US 2017/0225119 A1    Aug. 10, 2017

Related U.S. Application Data

(60) Provisional application No. 62/036,522, filed on Aug. 12, 2014.

(51) Int. Cl.
*B01D 53/50* (2006.01)
*B01D 53/60* (2006.01)
(Continued)

(52) U.S. Cl.
CPC .......... *B01D 53/60* (2013.01); *B01D 53/002* (2013.01); *B01D 53/145* (2013.01);
(Continued)

(58) Field of Classification Search
CPC .. B01D 53/14; B01D 53/1406; B01D 53/145; B01D 53/1456; B01D 53/50; B01D 53/60; B01D 53/62; B01D 53/86
(Continued)

(56) References Cited

U.S. PATENT DOCUMENTS 1,941,426 A * 12/1933 Beardsley ............... C01B 17/79
423/534
3,615,196 A * 10/1971 Welty ................. B01D 53/8609
423/244.02
(Continued)

FOREIGN PATENT DOCUMENTS

| CA | 2237744 A1 | 11/1999 |
| CA | 2745160 A1 | 1/2012 |
| CA | 2745172 A1 | 1/2012 |

OTHER PUBLICATIONS

Blanco, J. et al., "Two-bed catalytic system for NOx/SOx Removal", Catalysis Today, vol. 42, Issues 1-2, Jun. 18, 1998.

*Primary Examiner* — Frank M Lawrence, Jr.
(74) *Attorney, Agent, or Firm* — Oyen Wiggs Green & Mutala LLP

(57) ABSTRACT

A process for cleaning process gas removes sulfur oxides (SOx), nitrogen oxides (NOx), and particulate matter (PM) to produce a tail gas substantially free of these pollutants. The process oxidizes and absorbs SOx and NOx for storage as liquid acids. In some embodiments a PM removal stage and/or a SOx removal stage are provided in a close-coupled higher-pressure environment upstream from a turbocharger turbine. The process has example application in cleaning exhaust gases from industrial processes and large diesel engines such as ship engines.

54 Claims, 5 Drawing Sheets

(51) Int. Cl.
  *B01D 53/14* (2006.01)
  *B01D 53/00* (2006.01)
  *B01D 53/76* (2006.01)
  *B01D 53/86* (2006.01)
  *F23J 15/00* (2006.01)
  *F23J 15/02* (2006.01)
  *F23G 7/07* (2006.01)
  *B01D 53/62* (2006.01)

(52) U.S. Cl.
  CPC ......... *B01D 53/1406* (2013.01); *B01D 53/50* (2013.01); *B01D 53/502* (2013.01); *B01D 53/62* (2013.01); *B01D 53/76* (2013.01); *B01D 53/86* (2013.01); *B01D 53/8609* (2013.01); *B01D 53/869* (2013.01); *B01D 53/8631* (2013.01); *F23G 7/07* (2013.01); *F23J 15/003* (2013.01); *F23J 15/006* (2013.01); *F23J 15/025* (2013.01); *B01D 2252/103* (2013.01); *B01D 2255/102* (2013.01); *B01D 2255/20723* (2013.01); *B01D 2258/012* (2013.01); *B01D 2258/0283* (2013.01); *F23J 2215/20* (2013.01); *F23J 2219/40* (2013.01); *F23J 2219/60* (2013.01); *F23J 2900/15004* (2013.01); *Y02A 50/2344* (2018.01); *Y02A 50/2348* (2018.01); *Y02C 20/30* (2013.01)

(58) Field of Classification Search
  USPC ............ 55/428.1; 96/243, 355, 371; 95/214, 95/373, 232, 235; 423/239.1, 244.01, 423/244.02, 244.09
  See application file for complete search history.

(56) References Cited

U.S. PATENT DOCUMENTS

| | | | | |
|---|---|---|---|---|
| 3,950,493 | A * | 4/1976 | Dorr | C01B 17/806 261/157 |
| 5,030,428 | A * | 7/1991 | Dorr | B01D 53/8637 423/215.5 |
| 8,282,901 | B2 * | 10/2012 | Petrocelli | B01D 53/002 423/235 |
| 9,487,401 | B2 * | 11/2016 | Mollerhoj | C01B 17/765 |
| 2010/0041543 | A1 * | 2/2010 | Doring | F01N 3/025 502/34 |
| 2015/0322833 | A1 * | 11/2015 | Menon | F01N 3/04 423/212 |

* cited by examiner

GAS TREATMENT PROCESS AND APPARATUS

CROSS-REFERENCE TO RELATED APPLICATIONS

This application claims priority from U.S. Application No. 62/036,522 filed 12 Aug. 2014. For purposes of the United States, this application claims the benefit under 35 U.S.C. § 119 of U.S. Application No. 62/036,522 filed 12 Aug. 2014, and entitled GAS TREATMENT PROCESS AND METHOD OF OPERATING THE SAME which is hereby incorporated herein by reference for all purposes.

FIELD

The present invention relates to gas treatment processes (GTP) and systems for efficient removal of sulfur oxides (SOx), nitrogen oxides (NOx) and particulate matter (PM) from process gas. Applications include but are not limited to removing pollutants from the exhaust of large diesel engines such as ship engines and cleaning industrial process gases.

BACKGROUND

Removal of sulfur oxides (SOx), nitrogen oxides (NOx) and particulate matter (PM) from process gas is critical to meeting increasingly tight environmental regulations for multiple industries.

New regulations are pending for industrial process gases as well as exhaust gases. Some regulating bodies, such as US EPA, take a tiered approach to implementing new regulations on emissions from diesel engines. Marine diesel engines are targeted by new global regulations with respect to SOx and NOx.

Removal of SOx, NOx, and PM is difficult from the process engineering point of view for the following reasons:
(a) Most existing technologies only deal with one pollutant (SOx, NOx, or PM) for a given process.
(b) In many cases, the conditions that favor the removal of one pollutant, are unfavorable for the removal of another. For instance, engine technologies that reduce NOx emissions can increase the emissions of PM. Other technologies remove a single pollutant while leaving the others largely untouched.
(c) Existing technologies are expensive due to requirements for special chemical addition, expensive fuels, and combination of multiple technologies to achieve the goals of pollution control.
(d) The process conditions suitable for catalytic oxidation of $SO_2$ and NO are not compatible. While $SO_2$ catalysts require high temperatures (typically in excess of 380° C.) to perform adequately, catalytic NO oxidation is equilibrium-limited at high temperatures.
(e) The process conditions suitable for absorption/condensation of $SO_3$ and $H_2SO_4$ vapors while producing concentrated acids are not adequate for absorption of NOx.
(f) Catalytic oxidation of SOx and NOx is a challenge due to the presence of PM that may foul or deactivate the catalysts.
(g) Catalytic oxidation of NOx requires attention to the load of sulfur species, which can deactivate the catalyst.

A number of methods exist to meet the environmental regulations on SOx, NOx and PM. Typically, these methods rely on one of the following methodologies:

Use of Low-Sulfur Fuel. The use of low-sulfur fuels allows for a reduction in SOx emissions. However, low sulfur fuel is much more expensive than conventional high-sulfur fuel. Furthermore, the low-sulfur fuel alone does not reduce emissions of NOx or PM. Some embodiments of the present invention do not require changes to the fuel and reduce emissions of NOx and PM.

Gas Recirculation. NOx emissions from combustion processes can be reduced by recirculating a portion of the combustion product gas to the reaction zone to reduce the reaction temperature and oxygen content in the reaction zone, the two operating conditions that have the biggest impact on thermal-NOx formation. Gas recirculation may be known by different names, e.g. flue gas recirculation (FGR) for some combustion equipment and exhaust gas recirculation (EGR) for engine applications. However, gas recirculation does not reduce SOx emissions, and may increase PM emissions.

Engine Modifications. For engine applications, some pollution reduction systems require modifications of the engine itself, improved control of fuel injection timing and/or improved quality of atomization. Such modifications can improve the emissions of NOx and PM to a limited extent; however, in some cases, with significant fuel penalty. Further, these modifications do not reduce the emissions of SOx. Some embodiments of the present invention do not require modifications to the engine/generator and reduce emissions of SOx. In some embodiments the engine can be tuned to operate in its maximum efficiency settings.

Scrubbing of Exhaust Gas. Exhaust gas scrubbing systems, also known as scrubbers, including wet and dry scrubbers, can remove more than 90% SOx from exhaust gas, using seawater or freshwater as the scrubbing medium. The efficiency of scrubbers for removing PM, including solids and organic hydrocarbons, from diesel engines is rather poor compared to SOx removal, usually not exceeding 75%. Open-loop scrubbers are subject to several restrictions due to concerns about discharge of PAH and nitrates. Closed-loop scrubbers, on the other hand, may suffer PM and/or ash accumulation and fouling problems.

Chemical Scrubbing Technologies. These systems remove sulfur species by contacting the process gas with a chemical in a scrubber. These methods utilize a number of chemicals such as liquid caustic solutions or calcium hydroxide granules to capture the sulfur species. These methods typically produce a liquid or solid waste stream. Dry scrubbers are one example of chemical scrubbing. Depending on applications, dry scrubbers may operate over a broad temperature range. Chemical scrubbing can remove approximately 98% of SOx and approximately 50% of PM. However, these systems do not significantly reduce NOx, and the reduction in PM is typically insufficient to ensure compliance with emission control limits. Some embodiments of the present invention fundamentally differ from chemical scrubbing technologies because they do not require any additional chemical feeds, do not produce any byproducts or waste, and reduce emissions of NOx.

Absorption/Desorption Technologies. These technologies remove sulfur species using absorption/desorption columns. These methods typically utilize a fluid such as an amine to separate $SO_2$ from tail gas. These methods require large capital investments in very tall absorption/desorption columns and consume large amounts of energy to regenerate the absorber. Moreover, these technologies, would require further handling of the recovered $SO_2$ product, and do not reduce emissions of PM and NOx.

Selective Catalytic Reduction (SCR). SCR technologies can be effective in removing NOx from process gases. For example, urea-SCR requires the addition of urea/ammonia into the process gas to convert NOx into nitrogen gas. HC-SCR systems that use light hydrocarbons are still in the development stage. Neither type of SCR reduces emissions of PM and SOx. Further, the presence of sulfur species can deactivate the catalyst. Some embodiments of the present invention reduce emissions of PM and SOx and do not require urea/ammonia addition.

Lean NOx Traps (LNT). An LNT is an adsorber catalyst that oxidizes NO into $NO_2$ and adsorbs it in the washcoat under lean conditions in the presence of free oxygen. When the amount of $NO_2$ stored in the catalyst approaches its capacity, the NOx trap must be regenerated. To regenerate a NOx trap, reducing agents, such as gases containing $H_2$, CO, $C_2H_2$, $C_2H_4$ and $C_3H_6$, are introduced to the process stream to create a reducing atmosphere, under which the adsorbed $NO_2$ is released into the gas phase as NO, then chemically reduced by the reducing gases into $N_2$. The use of metal oxides in the formulation often makes NOx traps vulnerable to sulfur poisoning and deactivation. The sulfated and deactivated NOx trap must be desulfated at a higher temperature to recover its adsorption capacity. Some embodiments of the present invention do not use NOx traps and reduce emissions of PM and SOx.

Dry Contact Acid Plant Technologies. If the process gas contains a high concentration of sulfur species and a low concentration of water, it can be treated using a drying tower and a conventional dry contact acid plant. The key limitations of these technologies are the inability to treat process gas streams containing low $SO_2$ concentrations (typically about 6% mol $SO_2$ is the limit), the inability to treat process gas streams containing high water content, and the added complexity of a drying tower acid loop. Some embodiments of the present invention do not use a drying tower and can handle the conditions of low $SO_2$ concentrations.

WSA technology. Wet-gas sulfuric acid (WSA) technologies can be used to remove SOx in wet environments. However, these technologies do not reduce emissions of PM and NOx. Some embodiments of the present invention do not require glass tube refluxing acid condensers and reduce emissions of PM and NOx.

Diesel Particulate Filters (DPF). DPFs are wall-flow monolith filters commonly used in the automotive industry and stationary power generating units for capturing PM. However, DPFs are typically employed for use with specific process gases such as exhaust gases from the combustion of low-sulfur fuels. Some embodiments of the present invention may use a DPF as an option for PM removal, but the function can be performed by alternative means. Moreover, some embodiments of the present invention reduce emissions of SOx and NOx.

SUMMARY

The following embodiments and aspects thereof are described and illustrated in conjunction with systems, tools, and methods which are meant to be exemplary and illustrate, not limiting in scope. In various embodiments, one or more of the above-described problems have been reduced or eliminated, while some embodiments are directed to other improvements.

The present invention relates to process and systems for removing sulfur oxides (SOx), nitrogen oxides (NOx), and/or particulate matter (PM) from process gas.

The present invention has a number of aspects. One aspect of the present invention provides a gas treatment process including removing particulate matter (PM) from the process gas, oxidizing sulfur oxides (SOx) in the process gas using a SOx oxidation catalyst, and absorbing and/or condensing SOx oxidation products as sulfuric acid.

In some embodiments, the SOx oxidation catalyst comprises a $V_2O_5$-based catalyst. In some embodiments, the $V_2O_5$-based catalyst is Cs-based.

In some embodiments, the temperature of the process gas entering the SOx oxidation catalyst is below a maximum operating temperature of the SOx oxidation catalyst on a TWA basis. In some embodiments, the temperature of the process gas entering the SOx oxidation catalyst is between about 370° C. to about 500° C. on a TWA basis. In some embodiments, the temperature of the process gas entering the SOx oxidation catalyst is between about 390° C. to about 450° C. on a TWA basis.

In some embodiments, the SOx oxidation catalyst is located upstream of an expander/turbine. In some other embodiments, the SOx oxidation catalyst is located downstream of an expander/turbine. In some embodiments, the SOx oxidation catalyst is located between two stages of a two-stage expander/turbine.

In some embodiments, the gas treatment process further includes adding one or more of a heating agent, a hot flue gas, and a hot air stream to the process gas to maintain the temperature of the process gas entering the SOx oxidation catalyst within the range of about 370° C. to about 450° C.

In some embodiments, the heating agent comprises a combustible gas, for example one or more of syn gas, reformate from an onboard fuel processor, vaporized diesel fuel, and a partially-oxidized fuel.

In some embodiments, the SOx oxidation catalyst comprises active components that are coated on a flow-through monolith catalyst.

In some embodiments, the SOx oxidation catalyst is filled into a packed column.

In some embodiments, the SOx oxidation catalyst is operated under conditions wherein the SOx oxidation catalyst is operable to oxidize nitrogen oxides (NOx).

In some embodiments, the gas treatment process further includes oxidizing NOx in the process gas using a NOx oxidation catalyst.

In some embodiments, the gas treatment process further includes absorbing and/or condensing NOx oxidation products as nitric acid.

In some embodiments, the NOx oxidation catalyst comprises a PGM-based catalyst. In some other embodiments, the NOx oxidation catalyst comprises a $V_2O_5$-based SCR catalyst.

In some embodiments, the NOx oxidation catalyst is located downstream of an expander/turbine.

In some embodiments, the temperature of the process gas entering the NOx oxidation catalyst is between about 180° C. and about 450° C. In some embodiments, the temperature of the process gas entering the NOx oxidation catalyst is between about 200° C. and about 320° C. In some embodiments, the temperature of the process gas entering the NOx oxidation catalyst is between about 260° C. and about 300° C.

In some embodiments, the NOx oxidation catalyst is operated under conditions wherein the NOx oxidation catalyst is operable to oxidize SOx.

In some embodiments, the NOx oxidation catalyst is operated to oxidize SOx in the absence of ammonia and urea.

In some embodiments, the gas treatment process further includes mixing a trim cooling gas with the process gas stream upstream of the NOx oxidation catalyst to reduce the temperature of the process gas entering the NOx oxidation catalyst.

In some embodiments, the trim cooling gas comprises an oxygen-containing gas.

In some embodiments, the temperature of the process gas entering the NOx oxidation catalyst is between about 200° C. and about 320° C. In some embodiments, the temperature of the process gas entering the NOx oxidation catalyst is between about 260° C. and about 300° C.

In some embodiments, the gas treatment process further includes alternately adding a heating agent and a reducing agent to the NOx oxidation catalyst to raise a monolith temperature of the catalyst to a preset level and intermittently desulfate the NOx oxidation catalyst.

In some embodiments, removing PM comprises passing the process gas through one or more particulate filters.

In some embodiments, the one or more particulate filters oxidize combustible solids into $CO_2$.

In some embodiments, the gas treatment method further includes selecting PGM loading to establish a TWA process gas temperature that is above a soot balancing temperature of the catalytic filter to eliminate or substantially reduce the need to actively regenerate the one or more particulate filters.

In some embodiments, removing PM comprises passing the process gas through one or more gas liquid contactors.

In some embodiments, the one or more particulate filters are located downstream of the expander/turbine.

In some embodiments, the gas treatment process further includes raising the temperature of the process gas entering the one or more particulate filters in the range of about 550° C. and about 700° C. to actively regenerate the one or more particular filters. In some embodiments, the gas treatment process further includes raising the temperature of the process gas entering the one or more particular filters in the range of about 570° C. and about 630° C.

In some embodiments, an axial gas flow velocity of the one or more particulate filters is greater that an expected flame speed of the one or more particulate filters at a local pressure, an oxygen content, and typical regenerating temperatures.

In some embodiments, the gas treatment process further includes back purging the one or more particulate filters with short pulses of gas to remove ash collected in the one or more particulate filters.

In some embodiments, the gas treatment process further includes vacuum cleaning the one or more particulate filters to remove ash collected in the one or more particulate filters.

In some embodiments, the one or more particulate filters are arranged in parallel.

In some embodiments, the SOx oxidation products comprise $SO_3$.

In some embodiments, the $SO_3$ is absorbed/condensed as sulfuric acid at a temperature below a dewpoint temperature of sulfuric acid.

In some embodiments, the dewpoint temperature of sulfuric acid is in the range of about 100° C. to about 220° C.

In some embodiments, the NOx oxidation products comprise $NO_2$.

In some embodiments, the $NO_2$ is absorbed/condensed as nitric acid at a temperature below a dewpoint temperature of nitric acid.

In some embodiments, the dewpoint temperature of nitric acid is in the range of about 0° C. to about 70° C. In some embodiments, the dewpoint temperature of nitric acid is in the range of about 5° C. to about 35° C.

In some embodiments, one or more of the $SO_3$, the sulfuric acid, the $NO_2$, and the nitric acid, are absorbed and/or condensed between about 0° C. and about 70° C. In some embodiments, one or more of the $SO_3$, sulfuric acid, the $NO_2$, and nitric acid are absorbed and/or condensed between about 5° C. and about 35° C.

In some embodiments, absorbing and/or condensing the SOx oxidation products and/or the NOx oxidation products comprises using a recirculated acid spray contactor.

In some embodiments, absorbing and/or condensing the SOx oxidation products comprises using one or more of a Venturi contactor, a packed column, a tray column, a fluidized-bed contactor, a froth column, and a gas quencher.

In some embodiments, the gas treatment process further includes recycling gas substantially free of PM to an engine.

In some embodiments, the gas treatment process further includes filtering the sulfuric acid to remove trace amounts of solid particulates.

In some embodiments, the sulfuric acid comprises about 90 wt. % to about 98.5 wt. % sulfuric acid.

In some embodiments, absorbing and/or condensing SOx oxidation products and/or NOx oxidation products comprises passing the process gas through a high temperature condenser and/or absorber made of one or more of the following: graphite, silicon carbide, silicon iron, boronsilicate glass, glass, glass-lined steel, tantalum-lined steel, PTFE lined steel, glass fibers, PFA, fluoro-polymer lining, and acid resistant bricks.

In some embodiments, absorbing and/or condensing SOx oxidation products and/or NOx oxidation products comprises passing the process gas through a low temperature condenser and/or absorber made of one or more of the following: stainless steel alloys, plastics, and plastic lined steel.

In some embodiments, the stainless steel alloys comprise 904L, 316L, or 304.

In some embodiments, the plastic comprise FRP, PTFE, PFA, FEP, or PVC.

In some embodiments, the absorber/condenser comprises heat removal fluid that is kept at a pressure that is higher than a pressure of the process gas.

In some embodiments, the heat removal fluid is an oxygen-containing gas.

In some embodiments, the oxygen-containing gas is used in heat integration in the engine.

In some embodiments, the gas treatment process further includes removing acid droplets entrained from the absorber and/or condenser.

In some embodiments, the gas treatment process further includes hot purging gas-side equipment after shutdown.

In some embodiments, the gas treatment process further includes preheating the gas-side equipment before startup.

In some embodiments, removing acid droplets comprises using a demister. In some other embodiments, removing acid droplets is based on bimodal mist elimination via impaction and Brownian diffusion. In some other embodiments, removing acid droplets is based on wet electrostatic precipitation.

In some embodiments, oxidizing NOx occurs at a pressure that is less than a pressure used to oxidize SOx.

In some embodiments, oxidizing NOx occurs at a temperature that is less than a temperature used to oxidize SOx.

In some embodiments, the gas treatment process further includes cooling and/or heating the process gas to preferred temperature levels using one or more heat exchangers.

Another aspect of the present invention provides a gas treatment system including a particulate matter (PM) removal stage, a sulfur oxides (SOx) oxidation catalyst downstream of and in fluid communication with the PM removal stage, and an absorber/condenser downstream of and in fluid communication with the SOx oxidation catalyst for removing SOx oxidation products as sulfuric acid.

In some embodiments, the SOx oxidation catalyst comprises a $V_2O_5$-based catalyst. In some embodiments, the $V_2O_5$-based catalyst is Cs-based.

In some embodiments, the gas treatment system further includes an expander/turbine upstream of and in fluid communication with the SOx oxidation catalyst. In some other embodiments, the gas treatment system further includes an expander/turbine downstream of and in fluid communication with the SOx oxidation catalyst.

In some embodiments, the gas treatment system further includes a two-stage expander/turbine, wherein the SOx oxidation catalyst is located between two stages of the two-stage expander/turbine.

In some embodiments, the SOx oxidation catalyst comprises active components that are coated on a flow-through monolith catalyst.

In some embodiments, the SOx oxidation catalyst is filled into a packed column.

In some embodiments, the SOx oxidation catalyst is capable of oxidizing nitrogen oxides (NOx).

In some embodiments, the gas treatment system further includes a NOx oxidation catalyst downstream of and in fluid communication with the SOx oxidation catalyst.

In some embodiments, the absorber/condenser removes NOx oxidation products as nitric acid.

In some embodiments, the NOx oxidation catalyst comprises a PGM-based catalyst. In some other embodiments, the NOx oxidation catalyst comprises a $V_2O_5$-based SCR catalyst.

In some embodiments, the NOx oxidation catalyst is located downstream of the expander/turbine.

In some embodiments, the NOx oxidation catalyst is capable of oxidizing SOx.

In some embodiments, the NOx oxidation catalyst is capable of oxidizing SOx in the absence of one or more of ammonia, urea and ammonium sulfate.

In some embodiments, the PM removal stage comprises one or more particulate filters.

In some embodiments, the one or more particulate filters oxidize combustible solids into $CO_2$.

In some embodiments, the one or more particulate filters comprise a catalytic filter with PGM loading.

In some embodiments, the PGM loading is selected to establish a TWA process gas temperature that is above a soot balancing temperature of the catalytic filter to eliminate or substantially reduce the need to actively regenerate the one or more particulate filters.

In some embodiments, the PM removal stage comprises one or more gas liquid contactors.

In some embodiments, an axial gas flow velocity of the one or more particulate filters is greater that an expected flame speed of the one or more particulate filters at a local pressure, an oxygen content, and typical regenerating temperatures.

In some embodiments, the one or more particulate filters are arranged in parallel.

In some embodiments, the SOx oxidation products comprise $SO_3$.

In some embodiments, the $SO_3$ is absorbed/condensed as sulfuric acid at a temperature below a dewpoint temperature of sulfuric acid.

In some embodiments, the dewpoint temperature of sulfuric acid is in the range of about 100° C. to about 220° C.

In some embodiments, the NOx oxidation products comprise $NO_2$.

In some embodiments, the $NO_2$ is absorbed/condensed as nitric acid at a temperature below a dewpoint temperature of nitric acid.

In some embodiments, the dewpoint temperature of nitric acid is in the range of about 0° C. to about 70° C. In some embodiments, the dewpoint temperature of nitric acid is in the range of about 5° C. to about 35° C.

In some embodiments, one or more of the $SO_3$, the sulfuric acid, the $NO_2$, and the nitric acid, are absorbed and/or condensed between about 0° C. and about 70° C. In some embodiments, one or more of the $SO_3$, sulfuric acid, the $NO_2$, and nitric acid are absorbed and/or condensed between about 5° C. and about 35° C.

In some embodiments, the absorber/condenser comprises one or more of the following: a recirculated acid spray contactor, a Venturi contactor, a packed column, a tray column, a fluidized-bed contactor, a froth column, and a gas quencher.

In some embodiments, the gas treatment system further includes at least one acid circulation loop with inter-stage cooling for acid absorption.

In some embodiments, each acid circulation loop comprises one or more of a dedicated pump, an acid sump, and a cooler.

In some embodiments, each cooler controls the temperature of the at least one acid circulation loop.

In some embodiments, the sulfuric acid comprises about 90 wt. % to about 98.5 wt. % sulfuric acid.

In some embodiments, the absorber/condenser comprises a high temperature absorber/condenser made of one or more of the following: graphite, silicon carbide, silicon iron, boron-silicate glass, glass, glass-lined steel, tantalum-lined steel, PTFE lined steel, glass fibers, PFA, fluoro-polymer lining, and acid resistant bricks.

In some embodiments, the absorber/condenser comprises a low temperature absorber/condenser made of one or more of the following: stainless steel alloys, plastics, and plastic lined steel.

In some embodiments, the stainless steel alloys comprise 904L, 316L, or 304.

In some embodiments, the plastic comprise FRP, PTFE, PFA, FEP, or PVC.

In some embodiments, the gas treatment system further includes a mist removal stage.

In some embodiments, the mist removal stage comprises a demister.

In some embodiments, the gas treatment system further includes one or more heat exchangers to cool and/or heat the process gas.

In some embodiments, the gas treatment system further includes one or more induced draft fans installed to maintain a backpressure of the system below maximum allowable limits.

Another aspect of the present invention provides a gas treatment system including:
 (a) a particulate matter (PM) removal stage;
 (b) a sulfur oxides (SOx) oxidation catalyst downstream of and in fluid communication with the PM removal stage;

(c) a nitrogen oxides (NOx) oxidation catalyst downstream of and in fluid communication with the SOx oxidation catalyst;

(d) an absorber/condenser downstream of and in fluid communication with the NOx oxidation catalyst for removing SOx oxidation products as sulfuric acid and/or for removing NOx oxidation products as nitric acid;

(e) a mist removal stage downstream of and in fluid communication with the absorber/condenser;

(f) a stack or funnel downstream of and in fluid communication with the mist removal stage; and (g) a weak acid storage tank downstream of and in fluid with the absorber/condenser.

In some embodiments, the gas treatment system further includes a strong acid storage tank downstream of and in fluid with the absorber/condenser.

In some embodiments, the gas treatment system further includes a fuel processor and a flow diverting device downstream of and in fluid with the fuel processor, wherein the flow diverting device is upstream of and in fluid with the PM removal stage, the SOx oxidation catalyst, and the NOx oxidation catalyst.

Another aspect of the present invention provides a gas treatment system including:

(a) an engine system comprising a compressor or turbocharger, a combustion engine downstream of and in fluid with the compressor or turbocharger, a feed (fuel) tank upstream of and in fluid with the combustion engine, and an expander or turbine downstream of and in fluid with the combustion engine;

(b) a particulate matter (PM) removal stage downstream of and in fluid with the combustion engine;

(c) a sulfur oxides (SOx) oxidation catalyst downstream of and in fluid with the PM removal stage;

(d) a nitrogen oxides (NOx) oxidation catalyst downstream of and in fluid communication with the expander or turbine;

(e) an absorber/condenser downstream of and in fluid communication with the NOx oxidation catalyst for removing SOx oxidation products as sulfuric acid and/or for removing NOx oxidation products as nitric acid;

(f) a mist removal stage downstream of and in fluid communication with the NOx oxidation catalyst;

(g) a stack or funnel downstream of and in fluid communication with the mist removal stage; and (h) a weak acid storage tank downstream of and in fluid with the absorber/condenser, wherein the expander or turbine is downstream of and in fluid with the SOx oxidation catalyst.

In some embodiments, the gas treatment system further includes a strong acid storage tank downstream of and in fluid with the absorber/condenser.

In some embodiments, the gas treatment system further includes a flow diverting device downstream of and in fluid with the PM removal stage, wherein the flow diverting device recirculates fluid to the combustion engine.

Another aspect of the present invention provides a gas treatment system including:

(a) an engine system comprising a compressor or turbocharger, a combustion engine downstream of and in fluid with the compressor or turbocharger, a feed (fuel) tank upstream of and in fluid with the combustion engine, and an expander or turbine downstream of and in fluid with the combustion engine;

(b) a sulfur oxides (SOx) oxidation catalyst downstream of and in fluid with the combustion engine;

(c) a particulate matter (PM) removal stage downstream of and in fluid with the expander or turbine;

(d) a nitrogen oxides (NOx) oxidation catalyst downstream of and in fluid communication with the PM removal stage;

(e) an absorber/condenser downstream of and in fluid communication with the NOx oxidation catalyst for removing SOx oxidation products as sulfuric acid and/or for removing NOx oxidation products as nitric acid;

(f) a mist removal stage downstream of and in fluid communication with the absorber/condenser;

(g) a stack or funnel downstream of and in fluid communication with the mist removal stage; and (h) a weak acid storage tank downstream of and in fluid with the absorber/condenser, wherein the expander or turbine is downstream of and in fluid with the SOx oxidation catalyst.

In some embodiments, the gas treatment system further includes a strong acid storage tank downstream of and in fluid with the absorber/condenser.

Another aspect of the present invention provides a gas treatment system including:

(a) an engine system comprising a compressor or turbocharger, a combustion engine downstream of and in fluid with the compressor or turbocharger, an expander or turbine downstream of and in fluid with the combustion engine, a feed (fuel) tank upstream of and in fluid with the combustion engine, and a fuel processor downstream of and in fluid with the feed (fuel) tank;

(b) a particulate matter (PM) removal stage downstream of and in fluid with the expander or turbine;

(c) a sulfur oxides (SOx) oxidation catalyst downstream of and in fluid with the PM removal stage;

(d) a nitrogen oxides (NOx) oxidation catalyst downstream of and in fluid communication with the SOx oxidation catalyst;

(e) an absorber/condenser downstream of and in fluid communication with the NOx oxidation catalyst for removing SOx oxidation products as sulfuric acid and/or for removing NOx oxidation products as nitric acid;

(f) a mist removal stage downstream of and in fluid communication with the absorber/condenser;

(g) a stack or funnel downstream of and in fluid communication with the mist removal stage;

(h) a weak acid storage tank downstream of and in fluid with the absorber/condenser; and (i) a flow diverting device downstream of and in fluid with the fuel processor, wherein the flow diverting device is upstream of and in fluid with the PM removal stage, the SOx oxidation catalyst, and the NOx oxidation catalyst.

In some embodiments, the gas treatment system further includes a strong acid storage tank downstream of and in fluid with the absorber/condenser.

In some embodiments, the gas treatment system further includes a cooling agent and a mixer downstream of and in fluid with the cooling agent, wherein the mixer is downstream of and in fluid with the SOx oxidation catalyst and upstream of and in fluid with the NOx oxidation catalyst.

Another aspect of the present invention provides a gas treatment system including:

(a) an engine system comprising a compressor or turbocharger, a combustion engine downstream of and in fluid with the compressor or turbocharger, an expander or turbine downstream of and in fluid with the combustion engine, a feed (fuel) tank upstream of and in fluid with the combustion engine, and a fuel processor downstream of and in fluid with the feed (fuel) tank;

(b) a particulate matter (PM) removal stage downstream of and in fluid with the expander or turbine;
(c) a sulfur oxides (SOx) oxidation catalyst downstream of and in fluid with the PM removal stage;
(d) an absorber/condenser downstream of and in fluid with the SOx oxidation catalyst for removing SOx oxidation products as sulfuric acid and/or for removing nitrogen oxides (NOx) oxidation products as nitric acid;
(e) a mist removal stage downstream of and in fluid communication with the absorber/condenser;
(f) a stack or funnel downstream of and in fluid communication with the mist removal stage;
(g) a strong acid storage tank downstream of and in fluid with the absorber/condenser; and
(h) a flow diverting device downstream of and in fluid with the fuel processor, wherein the flow diverting device is upstream of and in fluid with the PM removal stage and the SOx oxidation catalyst.

In addition to the exemplary aspects and embodiments described above, further aspects and embodiments will become apparent by reference to the drawings and by study of the following detailed description.

BRIEF DESCRIPTION OF THE DRAWINGS

The accompanying drawings illustrate non-limiting example embodiments of the invention.

DETAILED DESCRIPTION

Figure 1:
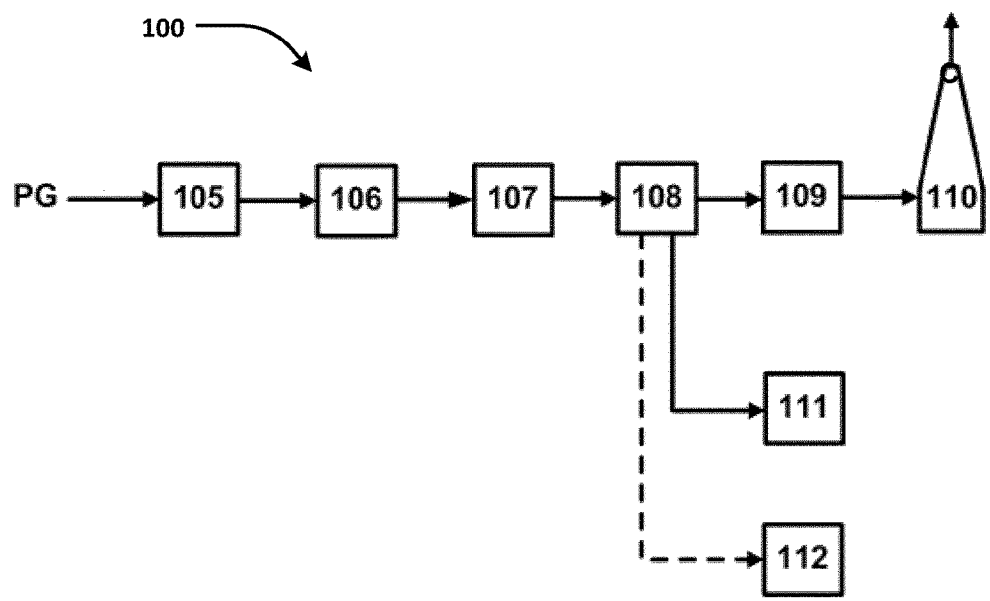
FIG. 1 is a schematic illustration of a gas treatment process (GTP) according to an example embodiment of the present invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Unless context dictates otherwise, the term "process gas" (as used herein) refers to gas from stationary as well as mobile sources, such as industrial process gas and also exhaust gas produced from diesel engines that contains one or more of SOx, NOx, and PM.

Unless context dictates otherwise, the term "diesel engine" (as used herein) includes all compression ignition (CI) engines, especially diesel engines for marine, locomotive and stationary power generating applications, with two-stroke, four-stroke or rotary operating cycles.

Unless context dictates otherwise, the term "gas treatment process" (GTP) (as used herein) is a process that removes one or more of SOx, NOx and PM.

Unless context dictates otherwise, the term "sulfur oxides" (SOx) (as used herein) includes $SO_2$ and $SO_3$, the two predominant products from combustion of sulfur-containing fuels and other sulfur-containing materials. Unless the context dictates otherwise, the term "SOx oxidation products" (as use herein) includes, but is not limited to $SO_2$ and $SO_3$.

Unless context dictates otherwise, the term "nitrogen oxides" (NOx) (as used herein) includes both fuel-NOx and thermal-NOx produced from combustion and other processes, comprising predominantly NO, $NO_2$, and other oxides of nitrogen. Unless context dictates otherwise, the term "NOx oxidation products" (as used herein) includes, but is not limited to, $NO_2$, $N_2O_3$, $N_2O_4$ and $N_2O_5$.

Unless context dictates otherwise, the term "particulate matter" (PM) (as used herein) includes a wide range of industrial particulate matter as well as the combustible carbonaceous fractions that consist of elemental carbon (EC) and organic carbon (OC), inert ash, metal sulfates, etc. OC comprises complex polyaromatic hydrocarbons (PAH), which stay in the gas phase unless the process gas is cooled down to their respective condensing temperatures. The combustible fraction of PM, consisting of amorphous EC and OC, is produced as a result of incomplete combustion and is commonly known as "soot".

Unless context dictates otherwise, the term "about" (as used herein) means near the stated value (i.e. within ±5% of the stated value).

Unless context dictates otherwise, the terms "inlet" and "inlet end" (as used herein in relation to the GTP and components thereof) means the location(s) wherein process gas to be treated is introduced into the GTP or components thereof. Unless context dictates otherwise, the terms "outlet" and "outlet end" (as used herein in relation to the GTP and components thereof) means the location(s) wherefrom treated process gas exits the GTP or components thereof. Unless context dictates otherwise, the term "upstream" (as used herein in relation to the GTP and components thereof) means a position that is more near the inlet end of a GTP relative to a position that is more near the outlet end. Unless context dictates otherwise, the term "downstream" (as used herein in relation to the GTP and components thereof) means a position opposite to upstream, i.e. a position that is more near the outlet end of a GTP relative to a position that is more near the inlet end.

Some example embodiments of the present invention provide a gas treatment process (GTP) for process gas containing one or more of the following:

(a) A combined SOx and $H_2SO_4$ vapor concentration greater than about 1 ppmv (i.e. parts per million on a volume basis), preferably between about 100 ppmv and about 10000 ppmv, and more preferably between about 500 ppmv and about 1000 ppmv.

(b) A combined NOx and $HNO_3$ vapor concentration of more than about 1 ppmv, preferably between about 100 ppmv and about 10000 ppmv, and more preferably between about 300 ppmv and about 1200 ppmv.

(c) PM continuous or intermittently.

(d) A $H_2O$ vapor concentration ranging from about 0 vol. % to about 50 vol. %, preferably between about 1 vol. % and about 15 vol. %, and more preferably between about 4 vol. % and about 8 vol. %.

A GTP 100 in accordance with an example embodiment is schematically illustrated in FIG. 1. Process gas PG is treated sequentially to remove PM and oxidize and absorb/condense SOx and NOx. SOx and NOx are removed in the form of liquid sulfuric and nitric acids. Clean gas C is exhausted to the atmosphere. GTP 100 comprises PM removal 105, catalytic SOx oxidation 106, catalytic NOx oxidation 107, single or multiple step absorption/condensation 108, mist removal 109, stack or funnel 110, weak acid (for example, $HNO_3$) storage 111, and strong acid (for example, $H_2SO_4$) storage 112. Process conditions may be adjusted to sulfurmaximize the oxidation and absorption/condensation of SOx and NOx sulfur for storage as liquid sulfuric and nitric acids.

Persons skilled in the art will recognize that the GTP as described herein can be applied to mobile as well as stationary applications, such as industrial process gas and exhaust gas produced from diesel engines. Variations of process steps 105 to 112 are schematically illustrated in the example embodiments in FIGS. 2 to 7.

Figure 2:
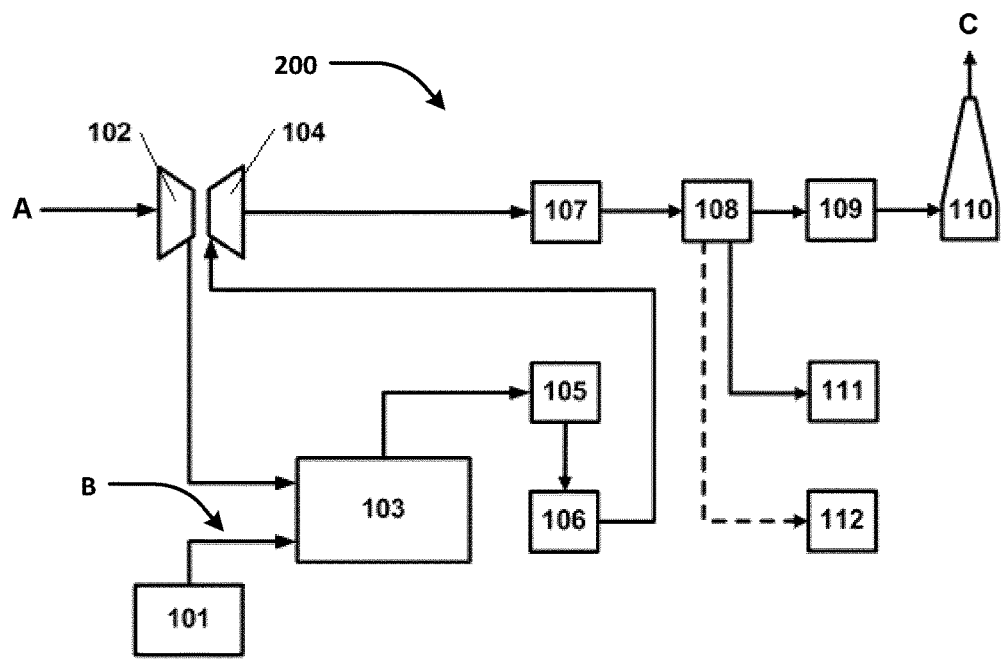
FIG. 2 is a schematic illustration of a gas treatment process (GTP) including close-coupled PM removal and SOx oxidation catalysis according to an example embodiment of the present invention.

FIG. 2 schematically illustrates a GTP 200 in accordance with another example embodiment. GTP 200 is similar to GTP 100; however, GTP 200 further comprises a feed (fuel) tank 101, a compressor or turbocharger 102, a combustion engine 103, and an expander or turbine 104. These components are also common to the example embodiments schematically illustrated in FIGS. 2 to 7. Fuel B from feed (fuel) tank 101 is supplied to combustion engine 103. Air or another oxygen-containing gas A is supplied to engine 103 via turbocharger 102 which includes a compressor driven by turbine 104 to compress intake air A. Following combustion and expansion in engine 103, process gas PG is discharged into an exhaust system. A gas manifold (not shown) may be used to collect PG in engines having multiple cylinders. Turbine 104 is coupled to turbocharger 102

PM in the process gas stream may be removed to protect downstream components from fouling and plugging. In some embodiments PM removal 105 is performed by one or more particulate filters, for example, monolith-type diesel particulate filters (DPFs). PM removal 105 is close-coupled (i.e. PM removal 105 is located at a position where the process gas temperature and pressure provide favourable equilibrium and kinetic conditions to achieve high SOx oxidation). DPFs may be catalyzed and installed in a position where the process gas temperature is higher than the soot balancing temperature in order to enable continuous, passive regeneration of the DPFs. Regeneration and/or de-ashing of particulate filters may be carried out by vacuum action. In some other embodiments PM removal 105 is performed by hot gas filters with back-pulse cleaning and dry electrostatic precipitators. In some other embodiments PM removal 105 may be performed using scrubbers with gas cooling and reheating. Examples include: Venturi scrubbers, spray towers, and other gas-liquid contactors. Gas reheating (not shown) is known to those skilled in the art and may be used.

Process gas lines from engine 103 (or multiple engines) may be branched to allow the process gas PG to be diverted through two or more PM removal stages 105 (for example, two or more DPFs) connected in parallel, so that each PM removal 105 may be isolated from the process gas stream to facilitate maintenance, intermittent regeneration and/or de-ashing. PM removal regeneration is implemented at gas flow rates sufficiently large to effectively remove heat generated from exothermic soot oxidation reactions, while at the same time restricted below an upper limit in order to reduce the energy requirement and equivalent fuel penalty to complete PM removal regeneration events over a typical operating cycle. Parallel PM removal devices may minimize the chances of failure at a system level. In some embodiments, to improve thermal stability of a particulate filter, the axial gas flow velocity in the filtering elements may be significantly larger than the expected flame speed at the local pressure, oxygen content and typical regenerating temperatures.

In some embodiments oxidation of $SO_x$ and NOx is performed by $SO_x$ and NOx oxidation catalysts, respectively. In some embodiments $SO_2$ and NO are oxidized into $SO_3$ and $NO_2$, respectively, by the $SO_2$ and NO oxidation catalysts. The chemical oxidation reactions of $SO_2$ and NO are as follows:

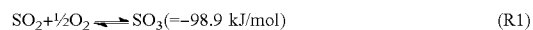

$$SO_2 + \tfrac{1}{2}O_2 \rightleftharpoons SO_3 (=-98.9 \text{ kJ/mol}) \quad (R1)$$

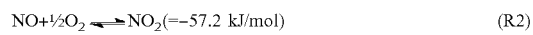

$$NO + \tfrac{1}{2}O_2 \rightleftharpoons NO_2 (=-57.2 \text{ kJ/mol}) \quad (R2)$$

Both (R1) and (R2) are exothermic reactions subject to equilibrium constraint at high temperature and kinetic limitation at low temperature. The reaction rates should be fast enough to achieve or closely approach chemical equilibrium, which requires sufficiently high reaction temperatures.

Figure 9A:
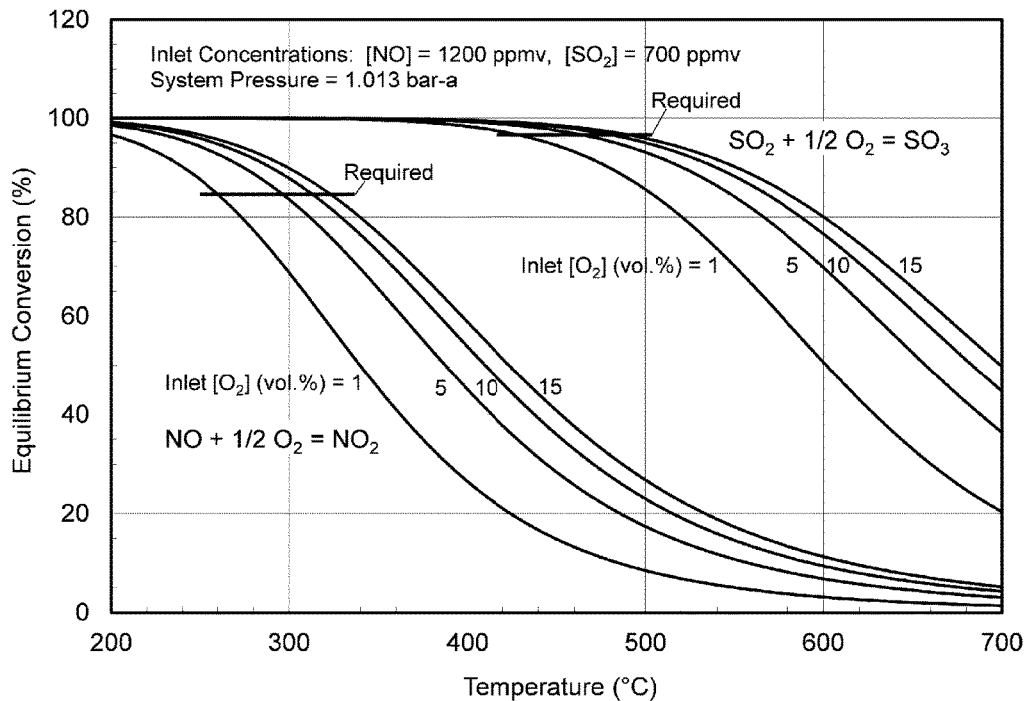
FIG. 9A is a graph showing the equilibrium oxidation conversion of $SO_2$ and NO as a function of temperature and process gas $O_2$ concentration at a pressure of 1.013 bar-a.
Figure 9B:
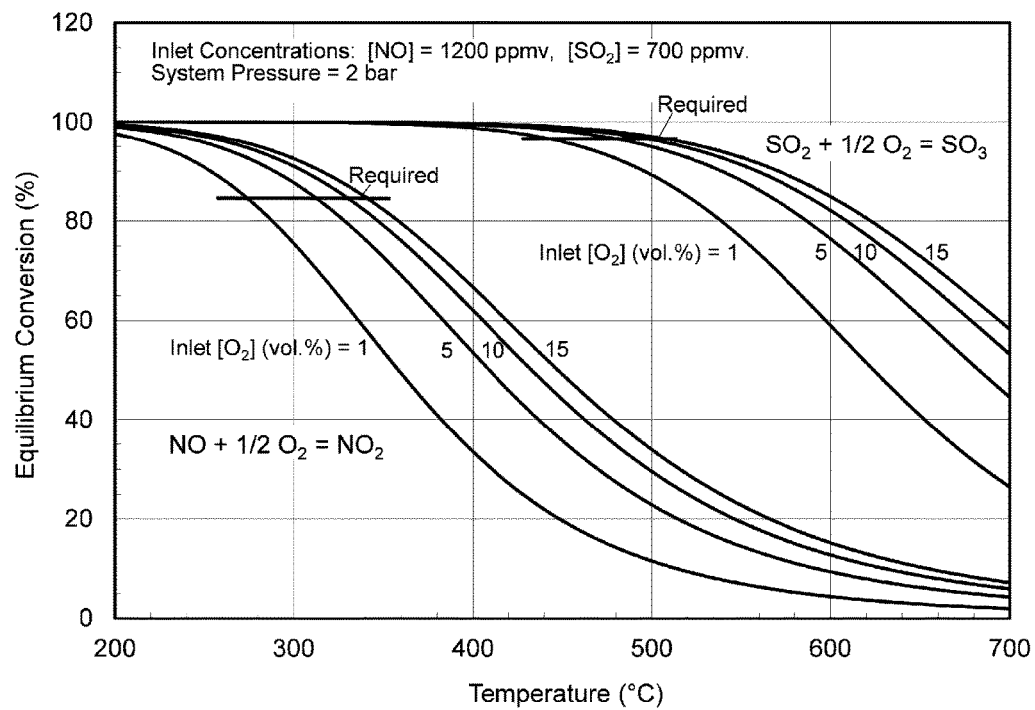
FIG. 9B is a graph showing the equilibrium oxidation conversion of $SO_2$ and NO as a function of temperature and process gas $O_2$ concentration at a pressure of 2 bar.

FIG. 9A shows the equilibrium conversion for $SO_2$ and NO oxidation as a function of temperature and $O_2$ concentration in process gas at a system pressure of 1.013 bar-a. As shown in FIG. 9B, equilibrium conversion increases at higher pressures (e.g. 2 bar). A maximum temperature exists corresponding to a required equilibrium conversion at a given $O_2$ concentration in the process gas. The graph of FIG. 9B refers to the scase of close-coupled catalysts installed upstream of a turbine.

As seen from FIGS. 9A and 9B, the optimum temperature ranges for the $SO_2$ and NO oxidation catalysts are different. Thus, a GTP comprising both catalysts requires careful integration of the catalysts into the system. The maximum process gas temperatures of $SO_2$ and NO oxidation catalysts that overcome any equilibrium constraints for achieving a set level of $SO_2$ and NO reduction efficiency and oxidation conversion in a typical application are summarized in TABLE 1.

TABLE 1

Maximum process gas temperatures for achieving set levels of $SO_2$ and NO reduction efficiency and oxidation conversion (assuming 100% absorption efficiency)

| | Catalyst | |
| --- | --- | --- |
| | $SO_2$ Oxidation Catalyst | NO Oxidation Catalyst |
| Required reduction efficiency (%) | 97% | 85% |

TABLE 1-continued

Maximum process gas temperatures for achieving set levels of $SO_2$ and NO reduction efficiency and oxidation conversion(assuming 100% absorption efficiency)

| Required oxidation conversion (%) | 98% | | 93% | |
|---|---|---|---|---|
| | Position of catalyst | | | |
| | Close-coupled | Downstream of Turbine | Close-coupled | Downstream of Turbine |
| Local process pressure (bar-a) | 2.0 | 1.05 | 2.0 | 1.05 |
| Maximum local catalyst temperature (° C.) | 480 | 450 | 300 | 280 |

A SOx catalyst 106 is employed to oxidize SOx in the process gas into SOx oxidation products.

In the example embodiment schematically illustrated in FIG. 2, the SOx oxidation catalyst 106 is installed at a close-coupled position where the process gas temperature is above the minimum operating temperature of the catalyst. At this position, the process gas temperature and pressure provide favourable equilibrium and kinetic conditions to achieve high SOx oxidation. For example, the minimum operating temperature of a Cs-promoted $V_2O_5$-based catalyst is approximately 370° C., preferably between about 380° C. and about 480° C., more preferably between about 390° C. and about 440° C., on a time-weighted average (TWA) basis. The higher temperature and pressure associated with a close-coupled position allows for a smaller catalyst volume due to improved chemical reaction kinetics and smaller gas volume flow.

In some embodiments the $SO_x$ oxidation catalyst 106 is provided in the form of a packed column. This packed column catalyst is highly robust, which can tolerate up to a few centimeters of ash accumulation. This ash tolerance may be advantageous because it can extend the de-ashing interval of the catalyst. In some other embodiments, for example in the example embodiment schematically illustrated in FIG. 3, SOx oxidation catalyst 206 is a flow-through monolith reactor and may be washcoated with the same active components used in a packed column catalyst.

In some embodiments, the SOx oxidation catalyst has some activity towards NOx oxidation. The NOx conversion of this catalyst is limited by chemical equilibrium considerations at the process temperatures and other conditions. For example, Cs-promoted $V_2O_5$-based catalysts have some NOx oxidation capability. In some embodiments, pre-conversion of NOx is advantageous to the GTPs described herein.

A NOx oxidation catalyst 107 is employed to oxidize NOx in the process gas into NOx oxidation products. In some embodiments the NOx oxidation catalyst comprises a diesel oxidation catalyst (DOC). Depending on formulation, a DOC catalyst may light off at temperatures typically between about 130° C. and about 180° C. To achieve high NOx oxidation, the NOx oxidation catalyst 107 operates in a temperature range of about 180° C. to about 450° C., preferably about 250° C. to about 350° C., more preferably between about 260° C. and about 320° C.

In some other embodiments a reformulated $V_2O_5$-based SCR catalyst may be used for NOx oxidation. $V_2O_5$-based SCR catalysts are deactivated by sulfur species at temperatures up to about 350° C. At these temperatures, a small fraction of $SO_2$ is oxidized into $SO_3$, which forms a catalyst-deactivating ammonium sulfate in the presence of $NH_3$ from ammonia or urea. However, in certain embodiments the present invention, ammonia and/or urea are not added to remove NOx. In the absence of $NH_3$, the issue of catalyst deactivation by ammonium sulfate is eliminated.

While SOx conversion by a NOx oxidation catalyst is often limited by chemical reaction kinetic considerations at the process conditions, in some embodiments NOx oxidation catalyst 107 may have some activity towards SOx oxidation as well. However, this additional conversion of $SO_2$ favors the design intent of the embodiments described herein.

In some embodiments a mixer or heat exchanger may be added to cool or heat the process gas temperature at the inlet of NOx oxidation catalyst 107 to an optimum temperature range in order to improve reaction kinetic rates while not imposing any equilibrium constraints on the oxidation reactions. The heat exchanger may use oxygen-containing gas, process water, boiler feed water, sea water and/or other heat transfer fluids as a cooling agent. Optionally, heat recovered may be used to heat the process gas stream at a lower temperature position.

Absorption/condensation 108 is employed to capture SOx and NOx species as sulfuric and nitric acid ($H_2SO_4$ and $HNO_3$) vapors. Optimized process gas temperatures and pressures balance gas-liquid diffusion-reaction, mist formation, effective absorption, slippage of SOx and NOx species, and product acid concentration. One or more absorption/condensation stages may be used to produce one or more streams of product acid.

To capture SOx and NOx as $H_2SO_4$ and $HNO_3$, absorption/condensation 108 cools the process gas. During cooling, the process gas reacts with water vapor in the process gas to produce sulfuric acid. This reaction occurs in the gas-phase as the gas is cooled. The rate of vapor phase reaction between $H_2O$, $SO_3$ and $H_2SO_4$ is very fast, and it is limited by its chemical equilibrium. Sulfuric acid is produced by the following reaction:

$$SO_3 + H_2O \rightleftharpoons H_2SO_4 \quad (R1)$$

During cooling, the process gas reacts with water vapor and oxygen in the process gas to produce nitric acid. Nitric acid is produced by the following reaction:

$$4NO_2 + 2H_2O + O_2 \rightleftharpoons 4HNO_3 \quad (R2)$$

Absorption/condensation 108 may be conducted within a closed loop (i.e. with water to form sulfuric and nitric acids coming from water found in the process gas). Accordingly, in some embodiments, no water or chemicals need be added for absorption/condensation 108 (with the exception of the amount required to start the process). Persons skilled in the art will recognize that absorption/condensation 108 may be conducted within an open loop, with or without neutralization of acids, depending on the requirements of a specific installation.

Parameters that determine the performance of absorption/condensation 108 include the dewpoint temperatures of $H_2SO_4$ and $HNO_3$. These dewpoint temperatures are a function of the process gas composition and system pressure. For a typical gas system, the $H_2SO_4$ dewpoint is between about 100° C. and about 220° C., while the $HNO_3$ dewpoint is between about 20° C. and about 70° C.

As the process gas stream is cooled, the following may be observed:
(a) No condensation is observed at temperatures above the $H_2SO_4$ dewpoint temperature.
(b) $H_2SO_4$ condenses as the gas is cooled below the $H_2SO_4$ dewpoint temperature. Substantially all of the $H_2SO_4$ has condensed from the process gas when the temperature reaches about 100° C.

(c) $HNO_3$ condenses when the process gas temperature is cooled below the $HNO_3$ dewpoint temperature. Substantially all of the $HNO_3$ has condensed from the process gas when the temperature reaches between about 35° C. to about 100° C.

In some embodiments single stage absorption/condensation may be used to cool the process gas below about 70° C., preferably below about 35° C., to produce a mixture of sulfuric acid and nitric acid. In some embodiments, this mixture may be stored in weak acid storage tank 111.

If more than a single stage absorption/condensation is used, the first stage may be operated at temperatures between about 70° C. to about 300° C. to maximize capture of $H_2SO_4$ (and minimize capture of $HNO_3$), while the final stage may be operated at temperatures below about 70° C., preferably below about 35° C., to maximize capture of $HNO_3$ (and minimize capture of $H_2SO_4$).

FIGS. 1 to 4 and 6 to 8 are schematic illustrations of example embodiments having two absorption/condensation 108 stages of contact. $H_2SO_4$ is produced in the first stage and stored in strong acid storage 112, while $HNO_3$ is produced in the second stage and stored in weak acid tank 111. $H_2SO_4$ may be commercialized. Absorption/condensation 108 may be carried out by means of direct gas liquid contactors or indirect condensers.

In some existing scrubber systems with a liquid discharge stream, PM and/or nitrates may be formed during the absorption of NOx thereby potentially creating compliance and water pollution issues. In some embodiments NOx absorption may be omitted. This may be achieved by carrying out absorption/condensation 108 at temperatures above the dewpoint temperature of $HNO_3$. For example, absorption/condensation 108 may be carried out at temperatures between about 100° C. to about 220° C. to capture $H_2SO_4$ (and minimize $HNO_3$ capture). The total volume of liquid captured by this system is much lower since most of the process water is not captured as acid product. This system may be advantageous for engines as well as industrial applications with limitations on, for example: 1) available layout space; 2) allowable capture of nitrates; 3) allowable equipment weight; 4) allowable acid storage capacity; and/or 5) product handling capabilities.

The process gas temperature at the outlet of absorption/condensation 108 defines the concentration of the acid product. The temperature should be selected to balance the effects of mist formation, effective absorption, slippage of SOx and NOx and/or product acid concentration. Higher temperatures allow higher sulfuric acid concentrations, typically up to 93 wt. % or higher to make a potentially sellable strong acid product. However, the temperatures required to capture NOx as nitric acid are much lower.

A number of apparatuses may be used for absorption/condensation 108. These include, but are not limited to:

(a) Direct-contact gas-liquid contactors such as: Venturi contactors, spray columns, packed columns, tray columns, fluidized-bed contactors, froth columns, direct contact gas quenchers, etc.

(b) Indirect-contact condensers such as: concurrent falling film condensers, indirect contact gas quenchers, countercurrent refluxing condensers and other heat exchangers.

(c) Combinations of the above, where the first stages of contact operate at higher temperature (to maximize product acid concentration and minimize mist formation), and the final stage of contact operates at the lowest temperature (to maximize recovery of SOx and NOx) as described elsewhere herein.

Process parameters, such as inlet temperature, supersaturation, droplet size, mass and heat transfer rates may be optimized to minimize mist formation and maximize capture of SOx and NOx.

Droplet sizes used in a direct-contact gas-liquid spray contactors may vary between about 50 μm to about 3000 μm. In some embodiments droplet sizes vary between about 200 μm to about 1000 μm depending on process conditions and geometry. The velocity of the process gas in direct-contact gas-liquid contactors may vary from about 0.05 m/s to about 10 m/s. The collection efficiency of single stage direct-contact gas-liquid contactors may be between about 70% and about 99.9% depending on equipment design. When large diameter droplets are used, poor heat and mass transfer results in reduced capture efficiency. Conversely, small droplets provide very good heat and mass transfer, but are easily entrained with the process gas.

Multiple acid circulation loops (not shown) with inter-stage cooling may be used to capture SOx and NOx. Each acid loop may have a dedicated pump, acid sump and/or cooler. One or multiple acid coolers can be used to control the temperature of each acid loop. The product acid of each stage of contact may be fed to earlier stages of contact (i.e. counter currently from the process gas point of view) to increase the product acid concentration.

The first point of contact between the process gas and the acid may be a small countercurrent flow of acid. The acid temperature of the liquid acid increases as it flows counter currently against the process gas flow. The temperature rise of the liquid acid can be between about 10° C. and about 200° C. This reduces shock cooling of the process gas when it is first contacted with the acid.

Indirect-contact condensers can be used to cool the process gas in a gradual and controlled manner. As the process gas is cooled, a film of acid condenses on the surface of the condenser. Acid vapors become super-saturated when the gas is cooled below its dewpoint. In an indirect-contact condenser, the film of acid initially has a concentration determined by the dewpoint conditions of the process gas. The concentration of the acid film changes as it flows along the length of the condenser and is determined by equilibrium conditions at the bottom of the equipment and the rate of heat and mass transfer. Heat is removed from the process gas and is transferred through the material used to construct the condenser into a thermal fluid such as molten salts, water/steam, cooling water, air, oxygen enriched air or oxygen. In some embodiments a reactive gas such as combustion air, oxygen enriched air, or oxygen may be heated in the condenser and then used in a combustion or oxidation process elsewhere. The heat removal fluid may be kept at higher pressure than the process gas to prevent leakage to the environment.

Fog formation occurs when a critical super-saturation ratio is exceeded. Formation of a liquid acid fog presents a significant challenge in the design of equipment. Reflux of hot heat transfer fluid from the coolant outlet can be used to increase the temperature of the heat transfer fluid entering the coolant inlet. This arrangement creates a tempered heat transfer fluid. By using this feature, the temperature difference between the surface of the condenser and the condensing process gas is decreased, reducing the likelihood of forming an acid fog.

The following factors may be used to determine the overall NOx removal efficiency of an absorber:

(a) Cooling media temperature: Colder cooling media is better for NOx removal. Seawater may be used for cooling in some applications. Global seawater temperatures typically vary from about 0° C. to about 32° C.
(b) Temperature approach: The outlet gas temperature should be kept as close as possible to the cooling media temperature. Lower temperature approaches require more expensive (i.e., larger) heat transfer equipment. Temperature approaches of about 1° C. to about 10° C. are achievable in well-designed and maintained heat exchangers.
(c) Inlet ratio of $NO_2$ to NOx: The higher the relative amount of $NO_2$, the higher the absorption efficiency. The present invention has a dedicated NOx oxidation catalyst to maximize this ratio. The higher the performance of the NOx oxidation catalyst, the lower efficiency requirement at the absorber/condenser.
(d) Inlet $O_2$ concentration: Higher $O_2$ concentration in the process gas helps to oxidize NOx and improve the absorption efficiency.
(e) Mass transfer surface area: Larger interfacial area and higher mass transfer coefficient in the absorber allows for higher efficiency. This is entirely determined by the geometry and hydraulics of the absorber. Large surface area is typically achieved with very fine sprays or with packing.
(f) Residence time: Longer residence time allows for higher efficiency. This is entirely determined by the geometry and hydraulics of the absorber.
(g) Pressure: Higher pressure increases absorption efficiency.
(h) Release of NO: Careful examination of the reaction network shows that there is a reverse path in the liquid phase to release NO in the absorber as $NO_2$ dissolves in water to form $HNO_3$ and $HNO_2$. $HNO_2$ decomposes to release NO by the liquid phase reaction $3HNO_2 \rightarrow HNO_3+H_2O+2NO$. This reaction limits absorption efficiency if there is no subsequent oxidation of the released NO. For this reason, conventional industrial NOx columns used in other applications are operated at high pressure, low temperature and high $O_2$ concentration, to encourage further oxidation of NO back to $NO_2$ within the absorber itself.

If the released NO is completely further oxidized into $NO_2$, the higher limit for absorption is given by the vapor-liquid equilibrium curves which are determined by the absorber temperature and pressure. The actual efficiency depends on the specifics of the equipment (contact time and contact area), the cooling media temperature (dependent on location and season), the temperature approach to the cooling media, and the rate of non-catalytic oxidation of NO at the absorber itself. This non-catalytic oxidation of NO by $O_2$ exhibits a negative temperature effect as its reaction rate increases with decreasing temperature.

There are two adjustable parameters that can increase the overall NOx removal rate without requiring changes to the absorber:
(a) Lowering the NO oxidation catalyst temperature: This can be performed by using heat exchange or trim cooling air. Lower catalyst temperature (assuming adequate reaction rates and catalyst volumes) allows for higher equilibrium conversion in the catalyst and higher overall performance of the system.
(b) Gas recirculation. Recirculating a portion of the product gas from a combustion process can significantly reduce thermal-NOx formation by decreasing flame temperature and oxygen concentration in the reaction zone. For engine applications, increasing the engine EGR ratio would reduce the engine-out NOx entering the gas treatment system and minimize the NOx absorption requirements.

In some embodiments absorption/condensation 108 may be integrated with mist removal 109 to remove acid droplets entrained from the absorber(s). Mist removal 109 comprises a disengagement zone (not shown) and a droplet/mist elimination device (not shown). The droplet/mist elimination device contains a gas filter or a series of gas filters or electrostatic precipitators that capture liquid acid droplets.

The critical droplet size is the size of the minimum stable liquid droplet that can survive as nucleation sites in the gas stream. If a supersaturated vapor contains a range of liquid droplet sizes, then the droplets of smaller diameters will evaporate, while the larger droplets will act as nucleation sites and grow. Droplets generated mechanically are typically orders of magnitude larger than the critical droplet size and will not evaporate. Therefore, it may be beneficial to use a dedicated impaction or interception demister. In some embodiments the critical droplet size may be in the sub-micron range and the use of high performance demisters may avoid a visible plume.

In some embodiments the droplet/mist elimination device may use bi-modal mist elimination given by an interception/impaction demister and a Brownian diffusion demister. The initial stage may remove droplets between about 10 μm to about 1000 μm in size which may be produced mechanically upstream. The final demisting stage may remove droplets in the sub-micron range which are produced due to chemical reaction and/or shock cooling. The demisters may use fiber made of materials such as PFA and chemical grade fiberglass.

In some embodiments the droplet/mist elimination device comprises a wet electrostatic precipitator (WESP).

Some or all of the aforementioned operations may be accomplished in the same vessel using acid-resistant materials. In some embodiments absorption/condensation 108, mist removal 109, acid storage are accomplished in the same vessel.

One or more storage tanks may be installed to store the acids produced during absorption/condensation 108. For example, in the FIGS. 1-4 and 6-7 example embodiments, the weak acids are stored in tank 111 and an optional tank 112 may be employed to store strong acids. In the FIG. 5 example embodiment, tank 112 is the only acid storage tank. Persons skilled in the art will recognize that the acid storage tank size desirable for a particular installation will depend on the process operation parameters, gas rate, and operation schedules.

In some embodiments one or more induced draft fans (ID Fans) are optionally installed at the inlet of stack/funnel 110. These fans may be advantageous for the following reasons:
(a) The ID fans may enable a balanced draft in the system to reduce the backpressure of the combustion equipment (e.g. a boiler furnace or an engine) to counter the additional pressure drop of the GTP.
(b) For engine applications, the engine backpressure must be maintained below the allowable limit, to which the engine's NOx approval is certified, for the safe operation of the engine. Increased engine backpressure decreases engine efficiency. Therefore, adding ID fans usually does not cause a net fuel penalty.
(c) The ID fans also help flush the GTP during start-up and shutdown to remove remnant combustible gases and reduce moisture condensation.

(d) The ID fans may accelerate gas flow to stack 110 and keep the gas plume clear.

Figure 6:
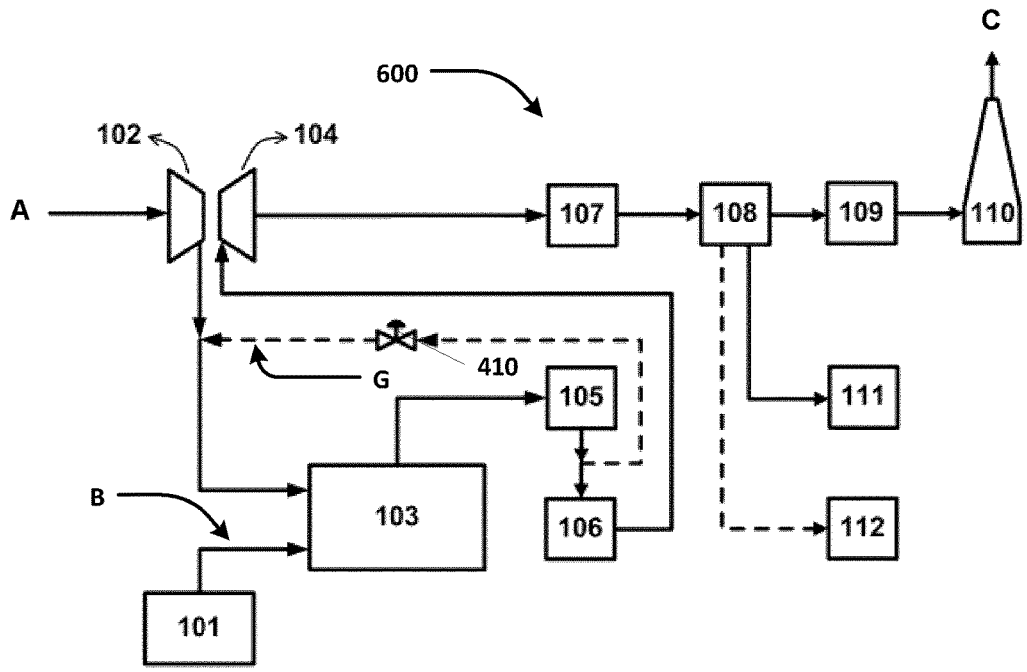
FIG. 6 is a schematic illustration of a gas treatment process (GTP) including exhaust gas recirculation (EGR) according to an example embodiment of the present invention.

A close-coupled location of the SOx oxidation catalyst, schematically illustrated in FIGS. 2 and 6, may beneficially allow for high reaction rates without equilibrium limitations. The higher temperature and pressure of the close-coupled position may also allow for a much smaller catalyst volume due to improved chemical reaction kinetics and gas density. Moreover, there is no energy penalty associated with reheating if the gas is kept at process temperatures (i.e. above about 400° C.). Ancillaries to these unit operations are not shown and are assumed known to those skilled in the art. Liquid scrubbing would require gas re-heat via indirect heat exchange or inline burning of fuel to reach the required temperatures for catalysis.

Trim air cooling or indirect heat exchange may be used to adjust the temperature of the NOx oxidation catalyst. This temperature adjustment can be done using tools known to those skilled in the art. The target temperature for NOx oxidation is between about 260° C. and about 320° C.

Figure 3:
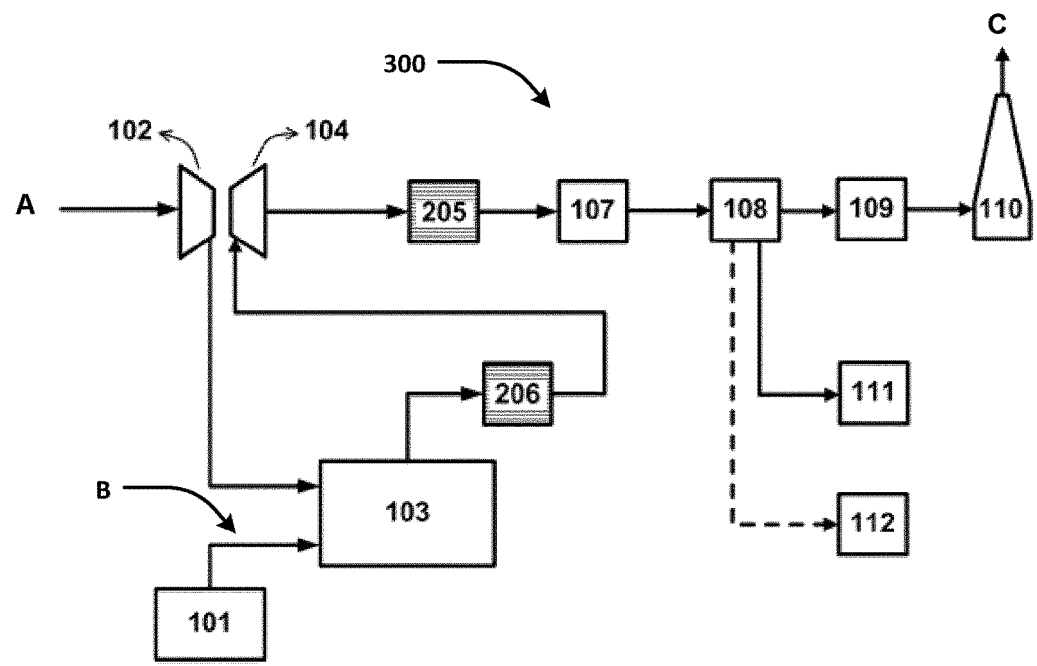
FIG. 3 is a schematic illustration of a gas treatment process (GTP) including a close-coupled flow-through monolith-type SOx oxidation catalyst according to an example embodiment of the present invention.

FIG. 3 shows schematically a GTP 300 according to an example embodiment. A close-coupled flow-through monolith type of catalyst 206, preferably a Cs-promoted $V_2O_5$-based catalyst, is employed upstream of turbine 104 for SOx oxidation. This flow-through monolith catalyst collects little particulates, and is therefore more robust than packed column-type catalysts that have to tolerate ash deposition in applications that involve dusty gases. The reaction kinetics and sizing of catalyst 206 benefit from a closed-coupled position.

In the example embodiment schematically illustrated in FIG. 2, PM removal 105 is positioned upstream of turbine 104, where the process gas temperature is lower. By moving PM removal 205 downstream of the turbine, as schematically illustrated in FIG. 3, the total buffer volume upstream of the turbine is much smaller than in close-coupled embodiments so that the impact on the turbine's dynamic response time is much smaller. In some embodiments a particulate filter may be used with high platinum-group metal (PGM) loading for continuous regeneration if the gas temperature is sufficiently high on a TWA basis. Alternatively, the particulate filter may be actively regenerated intermittently. To actively regenerate a particulate filter, the process gas temperature must be raised to about 550° C. or higher, but controlled below a preset temperature upper limit to avoid damage of the catalyst or filter substrate. In other example embodiments a gas-liquid contactor with gas re-heating may be used in this position.

Figure 4:
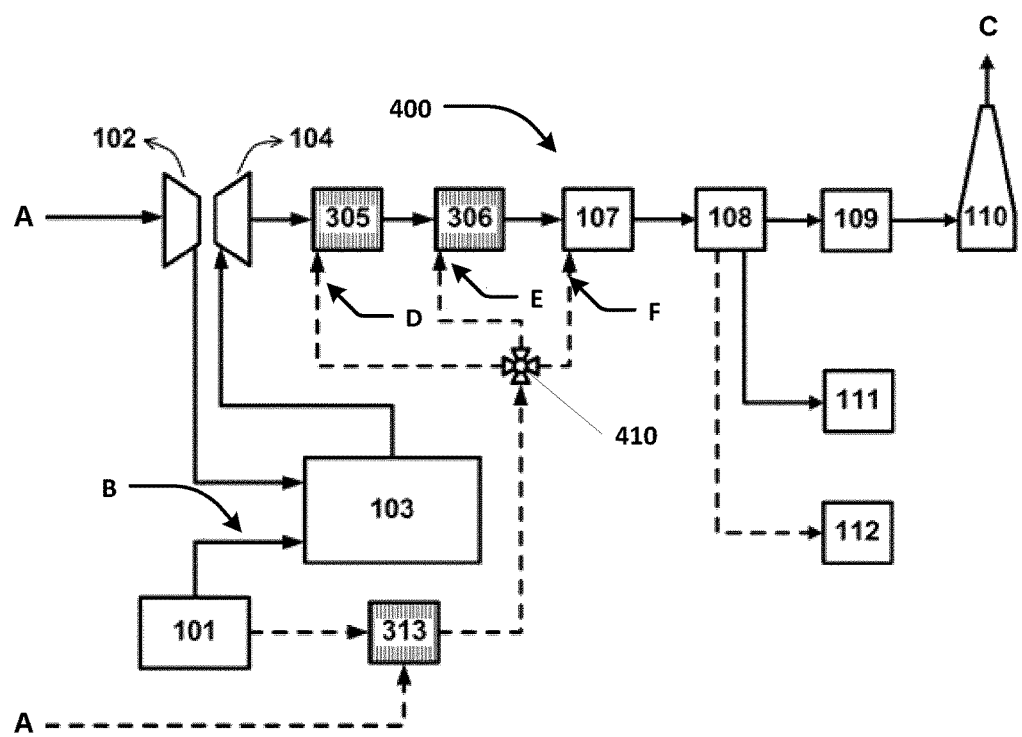
FIG. 4 is a schematic illustration of a gas treatment process (GTP) having capacity for active regeneration of a particulate filter according to an example embodiment of the present invention.

FIG. 4 illustrates schematically a GTP 400 in which PM removal 305 and SOx oxidation catalyst 306 are located downstream of turbine 104, with PM removal 305 upstream of SOs oxidation catalyst 306. GTP 400 includes capacity for active regeneration of a particulate filter. A fuel processor 313 is employed to perform multiple functions based on system control demands under different situations. Fuel processor 313 consumes a small amount of fuel on a time-averaged basis. Preferably, fuel processor 313 uses the same fuel used elsewhere in the system so that it can share the fuel supply system.

An air mover, e.g. a dedicated air blower or compressor (not shown), supplies air to fuel processor 313. Optionally, turbocharger 102 may be re-calibrated to accommodate increased air flow to serve as an air mover to supply air to fuel processor 313 as well as engine 103.

Fuel processor 313 operates either continuously or intermittently in different modes based on system control demands. For example:

(a) when operating in a fuel-rich mode, fuel processor 313 produces a partially oxidized fuel-derived gas (D).
(b) when operating in a fuel-lean mode, fuel processor 313 becomes a burner and produces a hot flue gas (E).
(c) when operating alternatingly or cyclically in rich and lean modes, fuel processor 313 produces a gas of varying composition (F).
(d) when no fuel is supplied to fuel processor 313, fuel processor 313 supplies cold air for, e.g. trim cooling purposes.

One or more 3-way or a 4-way valves or a flow diverting device 410 may be used to deliver gas from fuel processor 313 to inlets of different components as required by system control demand. For example:

(a) Gas from fuel processor 313 may be delivered upstream of PM removal 305 as a heating agent, either in the form of partially oxidized fuel-derived gas D or hot flue gas E to enable active regeneration of a particulate filter.
(b) Gas from fuel processor 313 may be delivered upstream of SOx oxidation catalyst 306 as a heating agent, either in the form of partially oxidized fuel-derived gas D or hot flue gas E to increase the process gas temperature to above the minimum operating temperature of the catalyst.
(c) Gas from fuel processor 313 may be delivered to an inlet of NOx oxidation catalyst 107 in the form of gas of varying composition F to enable desulfation of catalyst 107. Desulfation typically requires that the catalyst be heated in an oxidizing atmosphere to above a prescribed desulfation temperature, approximately 650° C., at which point the sulfur species in the catalyst become unstable. Desulfation in reducing atmosphere is then initiated.

Fuel processor 313 may be bypassed when no fuel is supplied to it. An air blower may deliver cold air through the same 3- or 4-way valve or flow diverting device 410 to NOx oxidation catalyst 107 for trim cooling.

In some embodiments the equipment of the GTP may be preheated and/or purged to prevent acid condensation, corrosion and fouling. Purging after shut-down removes acidic species from the equipment while maintaining PG-contacting surfaces of the equipment above the acid dewpoint. Moreover, pre-heating before start-up may be performed so that PG-contacting surfaces of the equipment are above the acid dewpoint before any process gas is passed through the equipment, thereby protecting the catalyst and equipment from corrosion and fouling.

Figure 5:
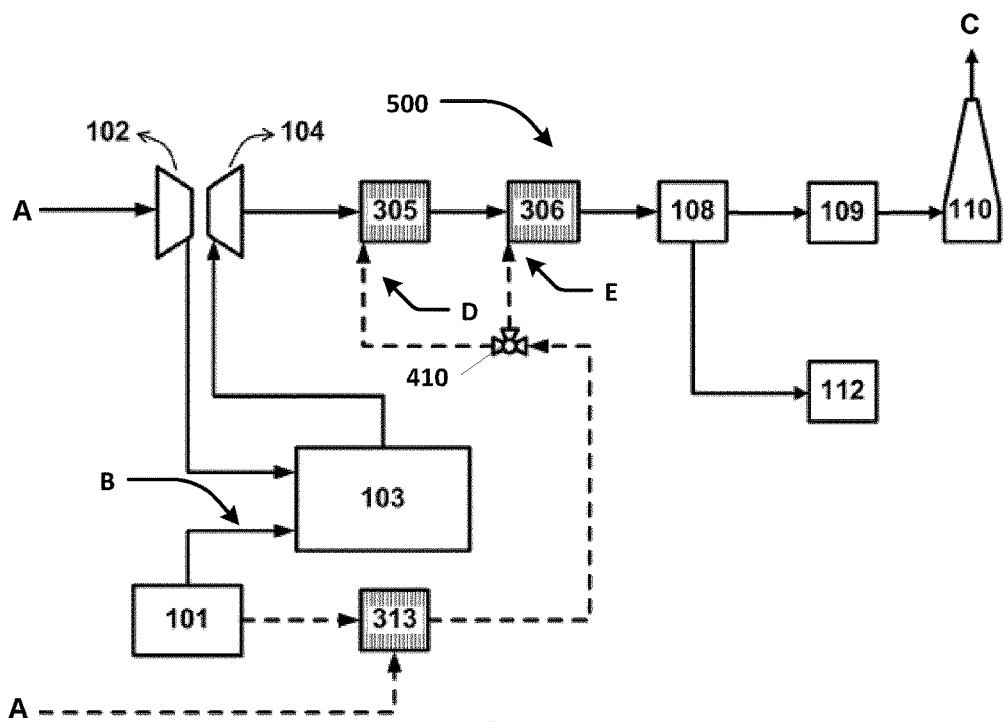
FIG. 5 is a schematic illustration of a gas treatment process (GTP) for removing SOx and PM according to an example embodiment of the present invention.

FIG. 5 schematically illustrates a GTP 500 that is similar to GTP 400 of FIG. 4, except that GTP 500 excludes NOx oxidation catalyst 107 (and the corresponding gas line for addition of gas of varying composition F). GTP 500 produces a stream of concentrated $H_2SO_4$ to be stored in storage tank 112. $H_2SO_4$ may be commercialized as described elsewhere herein.

In some embodiments, GTP 500 is modified to omit PM removal 305. In such systems, absorption/condensation 108 captures PM and SOx in the process gas to produce a concentrated sulfuric acid stream loaded with PM to be stored in storage tank 112 for disposal at a later time.

FIG. 6 schematically illustrates a GTP 600 in which exhaust gas recirculation (known as EGR for engine applications) is used to enhance removal of NOx/reduce NOx emissions. Persons skilled in the art will recognize that recirculated gas stream G employed by GTP 600 may be employed by any of the GTP described herein.

In the illustrated embodiment, PM removal 105 passes all of the process gas from engine 103. Where PM removal 105 is performed upstream of recirculated gas stream G, PM removal 105 also protects against fouling of equipment (e.g. an EGR valve) exposed to recirculated gas stream G. Providing one PM removal 105 to serve both recirculated gas stream G and process gas stream PR may reduce the total volume of PM removal equipment 105, especially compared to the case when separate sets of PM removal equipment 105 are used. The compactness of PM removal equipment 105 is also facilitated because PM removal equipment 105 is in a close-coupled position upstream from turbine 104 where the pressure is significantly higher than any location downstream of turbine 104. The effect of higher pressure overrides the effect of higher temperature so that PM removal equipment 105 can be sized smaller for the same filtration velocity based on total filtration area. In addition, by using one set of PM removal equipment 105 instead of two, the housing/canning, inlet and outlet cones, and other instrumentation do not have to be duplicated, making the system more compact in both physical volume and system control senses.

Figure 7:
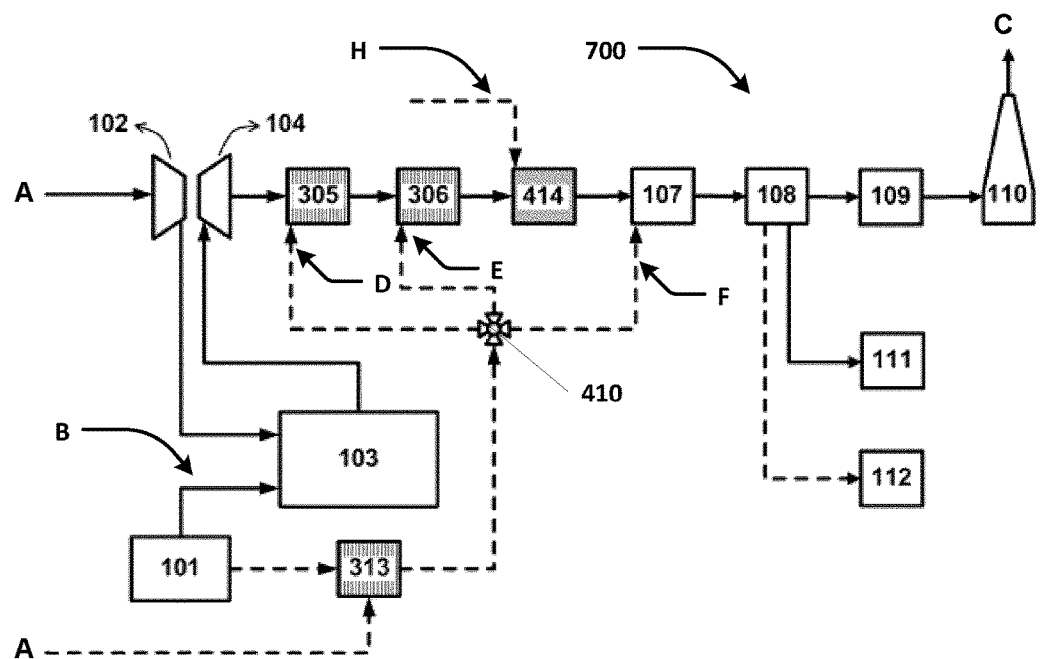
FIG. 7 is a schematic illustration of a gas treatment process (GTP) including capacity for active regeneration of a particular filter, thermal management of an SOx oxidation catalyst and desulfation of a NOx oxidation catalyst according to an example embodiment of the present invention.

FIG. 7 schematically illustrates a GTP 700 similar to GTP 400 except that GTP 700 further includes active cooling of the process gas between SOx oxidation catalyst 306 and NOx oxidation catalyst 107. This active cooling may be performed, for example, by active mixing-cooling of process gas in a static mixer 414 using cold air H as a cooling agent. Mixer 414 may be located downstream of SOx oxidation catalyst 306 and upstream of NOx oxidation catalyst 107.

In some embodiments PM removal 305 is carried out using a liquid scrubbing system at relatively low temperatures. Conventional equipment known to someone skilled in the art includes a variety of gas-liquid contactors. In some embodiments active mixing-cooling 414 is replaced by a gas reheating stage downstream from PM removal 305. Gas reheating may, for example, be conducted by adding a hot gas stream (e.g. from burning fuel) or indirect heat exchange with other hot process gas.

Figure 8:
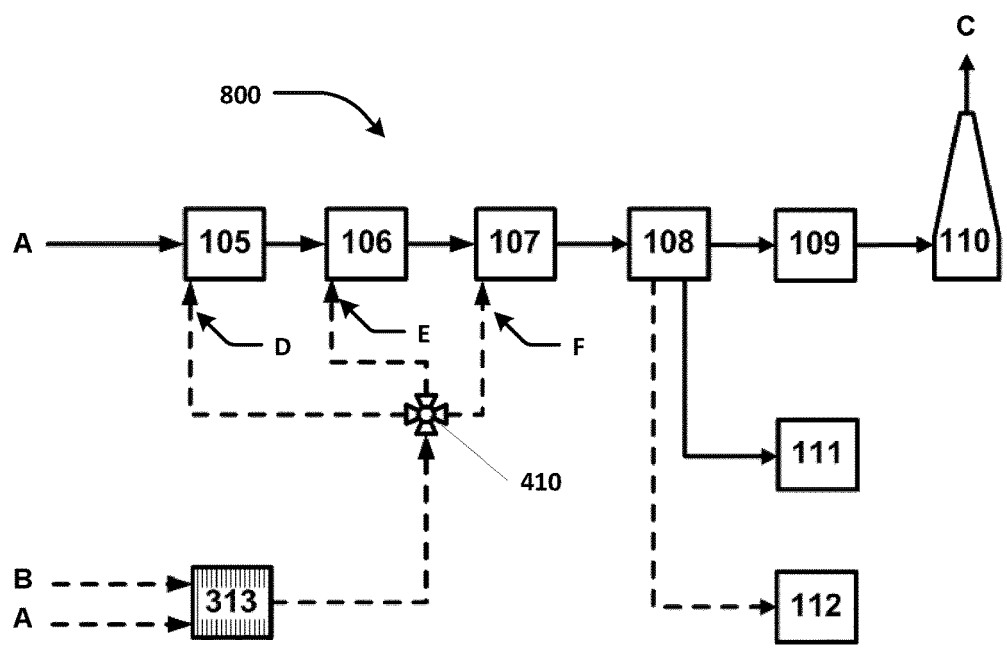
FIG. 8 is a schematic illustration of a gas treatment process (GTP) for treating industrial process gas according to an example embodiment of the present invention.

FIG. 8 shows schematically a GTP 800. GTP 800 is similar to the example GTP 100 of FIG. 1. However, GTP 800 is more specific to industrial process gas applications. Auxiliary fuel processor 313 is able to perform multiple functions beneficial to the working cycle of the system, including active regeneration of PM removal 105, thermal management and desulfation of the oxidation catalysts.

Persons skilled in the art will recognize that the GTPs described herein may optionally include any of a number of ancillary operations not shown. Some of these operations may be performed to improve chemical equilibrium conditions, chemical reaction kinetics, and/or absorption efficiency. These operations may include one or more of the following: cooling, reheating, compressing, and expanding. For example, heat exchangers may be used to cool and/or heat the process gas stream to desired temperatures to improve kinetic rates while not imposing equilibrium constraints to oxidation and absorption/condensation.

Persons skilled in the art will also recognize that the GTPs described herein may further comprise a control unit to perform various system- and component-level control functions. The control unit, together with instrumentation and signal lines, is not shown for simplicity.

Some advantages of the GTPs described herein include:
(i) No chemicals are required to neutralize the acids produced by the GTPs described herein. This eliminates the need for equipment to store and handle such chemicals, which are required in many existing systems.
(ii) Zero discharge of liquid pollutants (SOx, NOx, and PM) into the environment. All liquid and solid products, if applicable, can be stored for disposal, further processing or sale.

NON-LIMITING EXAMPLES

Non-limiting example applications of the invention are given below. Persons skilled in the art will recognize that these examples may be modified to suit the needs of a specific application in which the process gas entering the system is substantially free of a specific pollutant (e.g. PM, SOx or NOx), in which case its removal is not needed. Moreover, in some cases, it may be desirable to forego the removal of a specific pollutant due to other constraints specific to the application. For example, the system can be tailored to remove SOx and PM only.

Example 1

A process and system for removing SOx, NOx and PM from process gas to reduce engine process emissions comprises the following steps:
  Removal of PM using one or more particulate filters, or a gas liquid contactor;
  Oxidation of SOx using a catalyst;
  Oxidation of NOx, using a catalyst; and
  Removal of SOx, $H_2SO_4$, NOx and $HNO_3$ as sulfuric acid and nitric acid or their mixture by absorption and/or condensation.

One or more particulate filters may be used to remove PM. The particulate filter(s) could be of a DPF type manifolded together to provide a desired total filtration area for the gas flow being treated. If a packed column type of SOx oxidation catalyst is used, the DPF is preferably installed upstream of the SOx oxidation catalyst to protect the catalyst from deactivation due to blocking of the catalyst pores or contamination of the active molten phase by ash components. If a flow-through monolith type of SOx catalyst is used, the DPF can optionally be placed downstream of the expander/turbine in order to reduce the impact on the turbocharger dynamic response time. The DPF in a close-coupled position can serve both a process gas stream PG and a recirculated gas stream G.

The particulate filter may need to be regenerated and de-ashed to keep its pressure drop within limits. The particulate filter may be catalyzed with sufficient PGM-loading and installed in close-coupled location, where the gas temperature is above the soot-balancing temperature on a TWA basis. This may eliminate or substantially reduce the need for active regeneration of the particulate filter, and extend the time interval for de-ashing. It may also simplify the system configuration because provisions to enable active regeneration of the particulate filter are not required. Occasional de-ashing of the particulate filter may be conducted by pack-purging or vacuum action.

SOx oxidation may be achieved using a $V_2O_5$-based catalyst, preferably a Cs-promoted $V_2O_5$-based catalyst. The active components of the catalyst may be washcoated on a flow-through monolith to provide a large surface area with a small packing volume in order to reduce the impact on expander/turbine dynamic response time. Alternatively, the catalyst may be filled into a packed column when large cross section area and low pressure drop are preferred. The packed column may use commercial $V_2O_5$-based catalyst used in $H_2SO_4$ manufacture. In some embodiments, the SOx oxidation catalyst may provide NOx oxidation activity.

NOx oxidation may be achieved using a PGM-based catalyst or a reformulated $V_2O_5$-based SCR catalyst. In some embodiments, the NOx oxidation catalyst may provide SOx oxidation activity. At the same time, the SOx oxidation catalyst may provide NOx oxidation activity. Thus, the two oxidation catalysts, each focusing on one function, can supplement each other in order to achieve even higher equilibrium SOx and NOx conversion when high overall SOx and NOx removal efficiencies are required.

In some embodiments, SOx oxidation may be close-coupled upstream of a turbine/expander or between two stages of a two-stage turbine/expander, where the process gas temperature is between about 370° C. to about 500° C., preferably between about 390° C. to about 450° C., on a TWA basis. The NOx oxidation catalyst may be located downstream of the expander/turbine, where the process gas temperature is between about 180° C. to about 450° C., preferably between about 200° C. to about 320° C., more preferably between about 260° C. to about 300° C. to achieve high NOx conversion in a single stage. The NOx oxidation catalyst is preferably placed downstream of PM removal to reduce deactivation due to pore plugging, fouling and contamination by soot and ash.

The gas temperature at the outlet of the NO oxidation catalyst may be about 250° C. or higher. The gas temperature is preferably further cooled to slightly above the dewpoint temperature of the gas, preferably about 180° C. to about 200° C. to reduce thermal shock in the absorber/condenser stage. Gas cooling can be achieved by using one or more heat exchangers, coolers or direct mixing with trim cooling air. Alternatively, absorption/condensation may be added directly downstream of the NOx oxidation catalyst.

$SO_3$, $H_2SO_4$, $NO_2$ and $HNO_3$ vapors may be removed in one stage at low temperature, typically about 20° C. to about 70° C. using an absorber and/or a condenser to produce a dilute mixed acid. The absorber and/or the condenser may be a recirculated acid spray contactor, Venturi contactor, packed column, tray column, fluidized-bed contactor, froth column or gas quencher. Alternatively, acid vapors may be removed in two stages, the first stage being a condenser operating at a higher temperature, typically in the range of about 100° C. to about 220° C., to remove $SO_3$ and $H_2SO_4$ as high concentration sulfuric acid stream, while $NO_2$ may be absorbed/condensed at a lower temperature, typically between about 0° C. and about 70° C., more preferably between about 5° C. and about 35° C., as a dilute nitric acid stream. The first stage absorber/condenser is preferably a co-current condenser for better control of the gas temperature before it enters the second stage absorber/condenser.

A demister may be used to capture a wide range of liquid acid droplets based on bimodal mist elimination via impaction and Brownian diffusion or electrostatic precipitation.

The gas flow exiting the absorber/condenser may be reheated using heat recovered in the cooling stage to increase the natural draft of the funnel. Optionally one or more induced draft fans may be used to keep the engine backpressure below allowable limits as described elsewhere herein.

Example 2

A process and system for removal of SOx, NOx and PM from industrial process gas comprises the following steps:

Removal of PM using one or more particulate filters or a gas liquid contactor;
Oxidation of SOx using a catalyst;
Oxidation of NOx, using a catalyst; and
Removal of SOx, $H_2SO_4$, NOx and $HNO_3$ as sulfuric acid and nitric acid or their mixture by absorption or condensation.

The SOx and NOx oxidation catalysts are similar to those describe in Example 1. PM removal is also similar, with the exception that to regenerate and de-ash the particulate filter to keep its pressure drop within limits, the particulate filter may, alternatively, be actively regenerated by raising the process gas temperature and maintaining the temperature between about 550° C. and about 700° C., preferably between about 570° C. and about 630° C., using a heating agent to oxidize the combustible portion of PM into mostly $CO_2$ in a smooth, controlled manner. Occasional de-ashing of the particulate filter may be conducted by pack-purging or vacuum action.

The heating agent for active regeneration of the particulate filter could be in the form of a combustible gas or gas mixture, a hot flue gas from a burner or hot air. The same heat agent can also be used for thermal management of the oxidation catalysts as required.

An auxiliary fuel processor, able to operate either continuously or intermittently in both fuel-lean and fuel-rich modes based on system control demands, could be used to supply the heating agent. This fuel processor can produce a partially oxidized fuel-derived gas, hot flue gas or gas of varying composition.

Absorption/condensation is also similar to that described in Example 1. Additionally, in the absorber/condenser, the first point of contact between the process gas and the acid is a small countercurrent flow of acid. The acid temperature of the liquid acid increases as it flows counter currently against the gas flow. The temperature rise of the liquid acid can be between about 10° C. and about 200° C. This reduces shock cooling of the process gas when first contacted with the acid. The absorber/condenser may have multiple acid circulation loops with inter-stage cooling for acid absorption. Each acid loop may have a dedicated pump, acid sump and cooler. One or more acid coolers may be used to control the temperature of each acid loop.

The absorber/condenser may operate in the temperature range of about 150° C. to about 220° C. to produce a potentially sellable strong sulfuric acid product with about 90 wt. % to about 98.5 wt. % concentration. This may require further treatment of the acid to remove trace amounts of solid particulates. The condenser/absorber that operates in the temperature range of about 150° C. to about 220° C., producing a strong sulfuric acid, may be made of silicon carbide, silicon iron, boron-silicate glass, glass, glass-lined steel, tantalum-lined steel, PTFE lined steel, glass fibers, PFA, fluoro-polymer lining and/or acid resistant bricks. Alternatively, the condenser/absorber may be made of bonded graphite which is kept at a temperature above the dewpoint of nitric acid species to prevent nitric attack on the graphite and binder.

The condenser/absorber that operates at lower temperatures to produce weak acids could be made of stainless steel alloys (such as 904L, 316L, 304), plastics (such as FRP, PTFE, PFA, FEP, PVC) and/or plastic lined steel.

A demister may be used to capture a wide range of liquid acid droplets based on bimodal mist elimination via impaction and Brownian diffusion or electrostatic precipitation.

The gas flow exiting the absorber/condenser may be reheated using heat recovered in the cooling stage to increase the natural draft of the stack. Optionally, an induced draft fan may be used to keep the pressure balancing point at a preferred position in the system, for example, near the furnace outlet of a stationary boiler as described elsewhere herein.

The following are non-limiting enumerated example embodiments:

1. A gas treatment process comprising, in sequence:
   (a) removing particulate matter (PM) from the process gas;
   (b) oxidizing sulfur oxides (SOx) in the process gas using a SOx oxidation catalyst;
   (c) absorbing and/or condensing SOx oxidation products as sulfuric acid.
2. A gas treatment process according to example enumerated embodiment 1 (or any other example enumerated embodiment), wherein the SOx oxidation catalyst comprises a $V_2O_5$-based catalyst.
3. A gas treatment process according to example enumerated embodiment 2 (or any other example enumerated embodiment), wherein the $V_2O_5$-based catalyst is Cs-based.
4. A gas treatment process according to any one of example enumerated embodiments 1 to 3 (or any other example enumerated embodiment) wherein the temperature of the process gas entering the SOx oxidation catalyst is below a maximum operating temperature of the SOx oxidation catalyst on a TWA basis.
5. A gas treatment process according to example enumerated embodiment 4 (or any other example enumerated embodiment), wherein the temperature of the process gas entering the SOx oxidation catalyst is between about 370° C. to about 500° C. on a TWA basis.
6. A gas treatment process according to example enumerated embodiment 5 (or any other example enumerated embodiment), wherein the temperature of the process gas entering the SOx oxidation catalyst is between about 390° C. to about 450° C. on a TWA basis.
7. A gas treatment process according to any one of example enumerated embodiments 1 to 6 (or any other example enumerated embodiment), wherein the SOx oxidation catalyst is located upstream of an expander/turbine.
8. A gas treatment process according to any one of example enumerated embodiments 1 to 6 (or any other example enumerated embodiment), wherein the SOx oxidation catalyst is located downstream of an expander/turbine.
9. A gas treatment process according to any one of example enumerated embodiments 1 to 6 (or any other example enumerated embodiment), wherein the SOx oxidation catalyst is located between two stages of a two-stage expander/turbine.
10. A gas treatment process according to any one of example enumerated embodiments 1 to 9 (or any other example enumerated embodiment), further comprising adding one or more of a heating agent, a hot flue gas, and a hot air stream to the process gas to maintain the temperature of the process gas entering the SOx oxidation catalyst within the range of about 370° C. to about 450° C.
11. A gas treatment process according to example enumerated embodiment 10 (or any other example enumerated embodiment), wherein the heating agent comprises a combustible gas.
12. A gas treatment process according to example enumerated embodiment 11 (or any other example enumerated embodiment), wherein the combustible gas comprises one or more of syn gas, reformate from an onboard fuel processor, vaporized diesel fuel, and a partially-oxidized fuel.
13. A gas treatment process according to any one of example enumerated embodiments 1 to 12 (or any other example enumerated embodiment), wherein the SOx oxidation catalyst comprises active components that are coated on a flow-through monolith catalyst.
14. A gas treatment process according to any one of example enumerated embodiments 1 to 12 (or any other example enumerated embodiment), wherein the SOx oxidation catalyst is filled into a packed column.
15. A gas treatment process according to any one of example enumerated embodiments 1 to 14 (or any other example enumerated embodiment), wherein the SOx oxidation catalyst is operated under conditions wherein the SOx oxidation catalyst is operable to oxidize nitrogen oxides (NOx).
16. A gas treatment process according to any one of example enumerated embodiments 1 to 15 (or any other example enumerated embodiment), further comprising oxidizing NOx in the process gas using a NOx oxidation catalyst.
17. A gas treatment process according to example enumerated embodiments 15 or 16 (or any other example enumerated embodiment), further comprising absorbing and/or condensing NOx oxidation products as nitric acid.
18. A gas treatment process according to example enumerated embodiment 16 or 17 (or any other example enumerated embodiment), wherein the NOx oxidation catalyst comprises a PGM-based catalyst.
19. A gas treatment process according to example enumerated embodiment 16 or 17 (or any other example enumerated embodiment), wherein the NOx oxidation catalyst comprises a $V_2O_5$-based SCR catalyst.
20. A gas treatment process according to any one of example enumerated embodiments 16 to 19 (or any other example enumerated embodiment), wherein the NOx oxidation catalyst is located downstream of an expander/turbine.
21. A gas treatment process according to any one of example enumerated embodiments 16 to 20 (or any other example enumerated embodiment), wherein the temperature of the process gas entering the NOx oxidation catalyst is between about 180° C. and about 450° C.
22. A gas treatment process according to example enumerated embodiment 21 (or any other example enumerated embodiment), wherein the temperature of the process gas entering the NOx oxidation catalyst is between about 200° C. and about 320° C.
23. A gas treatment process according to example enumerated embodiment 22 (or any other example enumerated embodiment), wherein the temperature of the process gas entering the NOx oxidation catalyst is between about 260° C. and about 300° C.
24. A gas treatment process according to any one of example enumerated embodiments 16 to 23 (or any other example enumerated embodiment), wherein the NOx oxidation catalyst is operated under conditions wherein the NOx oxidation catalyst is operable to oxidize SOx.
25. A gas treatment process according to example enumerated embodiment 24 (or any other example enumerated embodiment), wherein the NOx oxidation catalyst is operated to oxidize SOx in the absence of ammonia and urea.

26. A gas treatment process according to any one of example enumerated embodiments 1 to 25 (or any other example enumerated embodiment), further comprising mixing a trim cooling gas with the process gas stream upstream of the NOx oxidation catalyst to reduce the temperature of the process gas entering the NOx oxidation catalyst.

27. A gas treatment process according to example enumerated embodiment 26 (or any other example enumerated embodiment), wherein the trim cooling gas comprises an oxygen-containing gas.

28. A gas treatment process according to example enumerated embodiment 26 or 27 (or any other example enumerated embodiment), wherein the temperature of the process gas entering the NOx oxidation catalyst is between about 200° C. and about 320° C.

29. A gas treatment process according to example enumerated embodiment 28 (or any other example enumerated embodiment), wherein the temperature of the process gas entering the NOx oxidation catalyst is between about 260° C. and about 300° C.

30. A gas treatment process according to any one of example enumerated embodiments 1 to 29 (or any other example enumerated embodiment), further comprising alternately adding a heating agent and a reducing agent to the NOx oxidation catalyst to raise a monolith temperature of the catalyst to a preset level and intermittently desulfate the NOx oxidation catalyst.

31. A gas treatment process according to any one of example enumerated embodiments 1 to 30 (or any other example enumerated embodiment), wherein removing PM comprises passing the process gas through one or more particulate filters.

32. A gas treatment process according to example enumerated embodiment 31 (or any other example enumerated embodiment), wherein the one or more particulate filters oxidize combustible solids into $CO_2$.

33. A gas treatment process according to example enumerated embodiment 30 or 32, wherein the one or more particulate filters comprise a catalytic filter with PGM loading.

34. A gas treatment process according to example enumerated embodiment 33 (or any other example enumerated embodiment), further comprising selecting PGM loading to establish a TWA process gas temperature that is above a soot balancing temperature of the catalytic filter to eliminate or substantially reduce the need to actively regenerate the one or more particulate filters.

35. A gas treatment process according to any one of example enumerated embodiments 1 to 30 (or any other example enumerated embodiment), wherein removing PM comprises passing the process gas through one or more gas liquid contactors.

36. A gas treatment process according to any one of example enumerated embodiments 31 to 35 (or any other example enumerated embodiment), wherein the one or more particulate filters are located downstream of the expander/turbine.

37. A gas treatment process according to any one of example enumerated embodiments 31 to 36 (or any other example enumerated embodiment), further comprising raising the temperature of the process gas entering the one or more particulate filters in the range of about 550° C. and about 700° C. to actively regenerate the one or more particular filters.

38. A gas treatment process according to example enumerated embodiment 37 (or any other example enumerated embodiment), further comprising raising the temperature of the process gas entering the one or more particular filters in the range of about 570° C. and about 630° C.

39. A gas treatment process according to any one of example enumerated embodiments 31 to 34 and 36 to 38 (or any other example enumerated embodiment), wherein an axial gas flow velocity of the one or more particulate filters is greater that an expected flame speed of the one or more particulate filters at a local pressure, an oxygen content, and typical regenerating temperatures.

40. A gas treatment process according to any one of example enumerated embodiments 31 to 39 (or any other example enumerated embodiment), further comprising back purging the one or more particulate filters with short pulses of gas to remove ash collected in the one or more particulate filters.

41. A gas treatment process according to any one of example enumerated embodiments 30 to 39 (or any other example enumerated embodiment), further comprising vacuum cleaning the one or more particulate filters to remove ash collected in the one or more particulate filters.

42. A gas treatment process according to any one of example enumerated embodiments 31 to 41 (or any other example enumerated embodiment), wherein the one or more particulate filters are arranged in parallel.

43. A gas treatment process according to any one of example enumerated embodiments 1 to 42 (or any other example enumerated embodiment), wherein the SOx oxidation products comprise $SO_3$.

44. A gas treatment process according to example enumerated embodiment 43 (or any other example enumerated embodiment), wherein the $SO_3$ is absorbed/condensed as sulfuric acid at a temperature below a dewpoint temperature of sulfuric acid.

45. A gas treatment process according to example enumerated embodiment 44 (or any other example enumerated embodiment), wherein the dewpoint temperature of sulfuric acid is in the range of about 100° C. to about 220° C.

46. A gas treatment process according to any one of example enumerated embodiments 17 to 45 (or any other example enumerated embodiment), wherein the NOx oxidation products comprise $NO_2$.

47. A gas treatment process according to example enumerated embodiment 46 (or any other example enumerated embodiment), wherein the $NO_2$ is absorbed/condensed as nitric acid at a temperature below a dewpoint temperature of nitric acid.

48. A gas treatment process according to example enumerated embodiment 47 (or any other example enumerated embodiment), wherein the dewpoint temperature of nitric acid is in the range of about 0° C. to about 70° C.

49. A gas treatment process according to example enumerated embodiment 48 (or any other example enumerated embodiment), wherein the dewpoint temperature of nitric acid is in the range of about 5° C. to about 35° C.

50. A gas treatment process according to any one of example enumerated embodiments 46 to 48 (or any other example enumerated embodiment), wherein one or more of the SO$_3$, the sulfuric acid, the NO$_2$, and the nitric acid, are absorbed and/or condensed between about 0° C. and about 70° C.

51. A gas treatment process according to any one of example enumerated embodiments 46 to 50 (or any other example enumerated embodiment), wherein one or more of the SO$_3$, sulfuric acid, the NO$_2$, and nitric acid are absorbed and/or condensed between about 5° C. and about 35° C.

52. A gas treatment process according to any one of example enumerated embodiments 1 to 51 (or any other example enumerated embodiment), wherein absorbing and/or condensing the SOx oxidation products comprises using a recirculated acid spray contactor.

53. A gas treatment process according to any one of example enumerated embodiments 17 to 52 (or any other example enumerated embodiment), wherein absorbing and/or condensing the NOx oxidation products comprises using the recirculated acid spray contactor.

54. A gas treatment process according to any one of example enumerated embodiments 1 to 51 (or any other example enumerated embodiment), wherein absorbing and/or condensing the SOx oxidation products comprises using one or more of a Venturi contactor, a packed column, a tray column, a fluidized-bed contactor, a froth column, and a gas quencher.

55. A gas treatment process according to any one of example enumerated embodiments 17 to 52 and 54 (or any other example enumerated embodiment), wherein absorbing and/or condensing the SOx oxidation products comprises using one or more of a Venturi contactor, a packed column, a tray column, a fluidized-bed contactor, a froth column, and a gas quencher.

56. A gas treatment process according to any one of example enumerated embodiments 1 to 55 (or any other example enumerated embodiment), further comprising recycling gas substantially free of PM to an engine.

57. A gas treatment process according to any one of example enumerated embodiments 1 to 56 (or any other example enumerated embodiment), further comprising filtering the sulfuric acid to remove trace amounts of solid particulates.

58. A gas treatment process according to any one of example enumerated embodiments 1 to 57 (or any other example enumerated embodiment), wherein the sulfuric acid comprises about 90 wt. % to about 98.5 wt. % sulfuric acid.

59. A gas treatment process according to any one of example enumerated embodiments 1 to 58 (or any other example enumerated embodiment), wherein absorbing and/or condensing SOx oxidation products comprises passing the process gas through a high temperature condenser and/or absorber made of one or more of the following: graphite, silicon carbide, silicon iron, boron-silicate glass, glass, glass-lined steel, tantalum-lined steel, PTFE lined steel, glass fibers, PFA, fluoro-polymer lining, and acid resistant bricks.

60. A gas treatment process according to any one of example enumerated embodiments 1 to 59 (or any other example enumerated embodiment), wherein absorbing and/or condensing NOx oxidation products comprises passing the process gas through a high temperature condenser and/or absorber made of one or more of the following: graphite, silicon carbide, silicon iron, boron-silicate glass, glass, glass-lined steel, tantalum-lined steel, PTFE lined steel, glass fibers, PFA, fluoro-polymer lining, and acid resistant bricks.

61. A gas treatment process according to any one of example enumerated embodiments 1 to 58 (or any other example enumerated embodiment), wherein absorbing and/or condensing SOx oxidation products comprises passing the process gas through a low temperature condenser and/or absorber made of one or more of the following: stainless steel alloys, plastics, and plastic lined steel.

62. A gas treatment process according to example enumerated embodiment 64, wherein the stainless steel alloys comprise 904L, 316L, or 304.

63. A gas treatment process according to example enumerated embodiments 64 or 62 (or any other example enumerated embodiment), wherein the plastic comprise FRP, PTFE, PFA, FEP, or PVC.

64. A gas treatment process according to any one of example enumerated embodiments 1 to 59 (or any other example enumerated embodiment), wherein absorbing and/or condensing NOx oxidation products comprises passing the process gas through a low temperature condenser and/or absorber made of one or more of the following: stainless steel alloys, plastics, and plastic lined steel.

65. A gas treatment process according to example enumerated embodiment 64 (or any other example enumerated embodiment), wherein the stainless steel alloys comprise 904L, 316L, or 304.

66. A gas treatment process according to example enumerated embodiments 64 or 65 (or any other example enumerated embodiment), wherein the plastic comprise FRP, PTFE, PFA, FEP, or PVC.

67. A gas treatment process according to any one of example enumerated embodiments 59 to 66, wherein the absorber/condenser comprises heat removal fluid that is kept at a pressure that is higher than a pressure of the process gas.

68. A gas treatment process according to example enumerated embodiment 67 (or any other example enumerated embodiment), wherein the heat removal fluid is an oxygen-containing gas.

69. A gas treatment process according to example enumerated embodiment 68 (or any other example enumerated embodiment), wherein the oxygen-containing gas is used in heat integration in the engine.

70. A gas treatment process according to any one of example enumerated embodiments 1 to 69 (or any other example enumerated embodiment), further comprising removing acid droplets entrained from the absorber and/or condenser.

71. A gas treatment process according to any one of example enumerated embodiments 1 to 70 (or any other example enumerated embodiment), further comprising hot purging gas-side equipment after shutdown.

72. A gas treatment process according to any one of example enumerated embodiments 1 to 71 (or any other example enumerated embodiment), further comprising preheating the gas-side equipment before startup.

73. A gas treatment process according to any one of example enumerated embodiments 70 to 72 (or any other example enumerated embodiment), wherein removing acid droplets comprises using a demister.

74. A gas treatment process according to example enumerated embodiment 73, (or any other example enumerated embodiment) wherein removing acid droplets is based on bimodal mist elimination via impaction and Brownian diffusion.

75. A gas treatment process according to example enumerated embodiment 73 (or any other example enumerated embodiment), wherein removing acid droplets is based on wet electrostatic precipitation.

76. A gas treatment process according to any one of example enumerated embodiments 16 to 75 (or any other example enumerated embodiment), wherein oxidizing NOx occurs at a pressure that is less than a pressure used to oxidize SOx.

77. A gas treatment process according to any one of example enumerated embodiments 16 to 76 (or any other example enumerated embodiment), wherein oxidizing NOx occurs at a temperature that is less than a temperature used to oxidize SOx.

78. A gas treatment process according to any one of example enumerated embodiments 1 to 77 (or any other example enumerated embodiment), further comprising cooling and/or heating the process gas to preferred temperature levels using one or more heat exchangers.

79. A gas treatment system comprising:
 (a) a particulate matter (PM) removal stage;
 (b) a sulfur oxides (SOx) oxidation catalyst downstream of and in fluid communication with the PM removal stage;
 (c) an absorber/condenser downstream of and in fluid communication with the SOx oxidation catalyst for removing SOx oxidation products as sulfuric acid.

80. A system according to example enumerated embodiment 79 (or any other example enumerated embodiment), wherein the SOx oxidation catalyst comprises a $V_2O_5$-based catalyst.

81. A system according to example enumerated embodiment 80 (or any other example enumerated embodiment), wherein the $V_2O_5$-based catalyst is Cs-based.

82. A system according to any one of example enumerated embodiments 79 to 81 (or any other example enumerated embodiment), further comprising an expander/turbine upstream of and in fluid communication with the SOx oxidation catalyst.

83. A system according to any one of example enumerated embodiments 79 to 81 (or any other example enumerated embodiment), further comprising an expander/turbine downstream of and in fluid communication with the SOx oxidation catalyst.

84. A system according to any one of example enumerated embodiments 79 to 81 (or any other example enumerated embodiment), further comprising a two-stage expander/turbine, wherein the SOx oxidation catalyst is located between two stages of the two-stage expander/turbine.

85. A system according to any one of example enumerated embodiments 79 to 84 (or any other example enumerated embodiment), wherein the SOx oxidation catalyst comprises active components that are coated on a flow-through monolith catalyst.

86. A system according to any one of example enumerated embodiments 79 to 85 (or any other example enumerated embodiment), wherein the SOx oxidation catalyst is filled into a packed column.

87. A system according to any one of example enumerated embodiments 79 to 86 (or any other example enumerated embodiment), wherein the SOx oxidation catalyst is capable of oxidizing NOx.

88. A system according to any one of example enumerated embodiments 79 to 87 (or any other example enumerated embodiment), further comprising a nitrogen oxides (NOx) oxidation catalyst downstream of and in fluid communication with the SOx oxidation catalyst.

89. A system according to example enumerated embodiment 88 (or any other example enumerated embodiment), wherein the absorber/condenser removes NOx oxidation products as nitric acid.

90. A system according to example enumerated embodiment 88 or 89 (or any other example enumerated embodiment), wherein the NOx oxidation catalyst comprises a PGM-based catalyst.

91. A system according to example enumerated embodiment 88 or 89 (or any other example enumerated embodiment), wherein the NOx oxidation catalyst comprises a $V_2O_5$-based SCR catalyst.

92. A system according to any one of example enumerated embodiments 88 to 91 (or any other example enumerated embodiment), wherein the NOx oxidation catalyst is located downstream of the expander/turbine.

93. A system according to any one of example enumerated embodiments 88 to 92 (or any other example enumerated embodiment), wherein the NOx oxidation catalyst is capable of oxidizing SOx.

94. A system according to example enumerated embodiment 93 (or any other example enumerated embodiment), wherein the NOx oxidation catalyst is capable of oxidizing SOx in the absence of one or more of ammonia, urea and ammonium sulfate.

95. A system according to any one of example enumerated embodiments 79 to 94 (or any other example enumerated embodiment), wherein the PM removal stage comprises one or more particulate filters.

96. A system according to example enumerated embodiment 95 (or any other example enumerated embodiment), wherein the one or more particulate filters oxidize combustible solids into $CO_2$.

97. A system according to example enumerated embodiment 95 or 96 (or any other example enumerated embodiment), wherein the one or more particulate filters comprise a catalytic filter with PGM loading.

98. A system according to example enumerated embodiment 97 (or any other example enumerated embodiment), wherein the PGM loading is selected to establish a TWA process gas temperature that is above a soot balancing temperature of the catalytic filter to eliminate or substantially reduce the need to actively regenerate the one or more particulate filters.

99. A system according to any one of example enumerated embodiments 79 to 94 (or any other example enumerated embodiment), wherein the PM removal stage comprises one or more gas liquid contactors.

100. A system according to any one of example enumerated embodiments 95 to 98 (or any other example enumerated embodiment), wherein an axial gas flow velocity of the one or more particulate filters is greater that an expected flame speed of the one or more particulate filters at a local pressure, an oxygen content, and typical regenerating temperatures.

101. A system according to any one of example enumerated embodiments 95 to 98 and 100 (or any other example enumerated embodiment), wherein the one or more particulate filters are arranged in parallel.

102. A system according to any one of example enumerated embodiments 79 to 101 (or any other example enumerated embodiment), wherein the SOx oxidation products comprise SO$_3$.

103. A system according to example enumerated embodiment 102 (or any other example enumerated embodiment), wherein the SO$_3$ is absorbed/condensed as sulfuric acid at a temperature below a dewpoint temperature of sulfuric acid.

104. A system according to example enumerated embodiment 103 (or any other example enumerated embodiment), wherein the dewpoint temperature of sulfuric acid is in the range of about 100° C. to about 220° C.

105. A system according to any one of example enumerated embodiments 88 to 104 (or any other example enumerated embodiment), wherein the NOx oxidation products comprise NO$_2$.

106. A system according to example enumerated embodiment 105 (or any other example enumerated embodiment), wherein the NO$_2$ is absorbed/condensed as nitric acid at a temperature below a dewpoint temperature of nitric acid.

107. A system according to example enumerated embodiment 106 (or any other example enumerated embodiment), wherein the dewpoint temperature of nitric acid is in the range of about 0° C. to about 70° C.

108. A system according to example enumerated embodiment 107 (or any other example enumerated embodiment), wherein the dewpoint temperature of nitric acid is in the range of about 5° C. to about 35° C.

109. A system according to any one of example enumerated embodiments 105 to 107 (or any other example enumerated embodiment), wherein one or more of the SO$_3$, the sulfuric acid, the NO$_2$, and the nitric acid, are absorbed and/or condensed between about 0° C. and about 70° C.

110. A system according to any one of example enumerated embodiments 105 to 109 (or any other example enumerated embodiment), wherein one or more of the SO$_3$, sulfuric acid, the NO$_2$, and nitric acid are absorbed and/or condensed between about 5° C. and about 35° C.

111. A system according to any one of example enumerated embodiments 79 to 110 (or any other example enumerated embodiment), wherein the absorber/condenser comprises one or more of the following: a recirculated acid spray contactor, a Venturi contactor, a packed column, a tray column, a fluidized-bed contactor, a froth column, and a gas quencher.

112. A system according to any one of example enumerated embodiments 79 to 111 (or any other example enumerated embodiment), further comprising at least one acid circulation loop with inter-stage cooling for acid absorption.

113. A system according to example enumerated embodiment 112 (or any other example enumerated embodiment), wherein each acid circulation loop comprises one or more of a dedicated pump, an acid sump, and a cooler.

114. A system according to example enumerated embodiment 113 (or any other example enumerated embodiment), wherein each cooler controls the temperature of the at least one acid circulation loop.

115. A system according to any one of example enumerated embodiments 79 to 114 (or any other example enumerated embodiment), wherein the sulfuric acid comprises about 90 wt. % to about 98.5 wt. % sulfuric acid.

116. A system according to any one of example enumerated embodiments 79 to 110 and 112 to 115 (or any other example enumerated embodiment), wherein the absorber/condenser comprises a high temperature absorber/condenser made of one or more of the following: graphite, silicon carbide, silicon iron, boronsilicate glass, glass, glass-lined steel, tantalum-lined steel, PTFE lined steel, glass fibers, PFA, fluoro-polymer lining, and acid resistant bricks.

117. A system according to any one of example enumerated embodiments 79 to 110 and 112 to 115 (or any other example enumerated embodiment), wherein the absorber/condenser comprises a low temperature absorber/condenser made of one or more of the following: stainless steel alloys, plastics, and plastic lined steel.

118. A system according to example enumerated embodiment 117 (or any other example enumerated embodiment), wherein the stainless steel alloys comprise 904L, 316L, or 304.

119. A system according to example enumerated embodiments 117 or 118 (or any other example enumerated embodiment), wherein the plastic comprise FRP, PTFE, PFA, FEP, or PVC.

120. A system according to any one of example enumerated embodiments 79 to 119 (or any other example enumerated embodiment), further comprising a mist removal stage.

121. A system according to example enumerated embodiment 120 (or any other example enumerated embodiment), wherein the mist removal stage comprises a demister.

122. A system according to any one of example enumerated embodiments 79 to 121 (or any other example enumerated embodiment), further comprising one or more heat exchangers to cool and/or heat the process gas.

123. A system according to any one of example enumerated embodiments 79 to 122 (or any other example enumerated embodiment), further comprising one or more induced draft fans installed to maintain a backpressure of the system below maximum allowable limits.

124. A gas treatment system comprising:
  (a) a particulate matter (PM) removal stage;
  (b) a sulfur oxides (SOx) oxidation catalyst downstream of and in fluid communication with the PM removal stage;
  (c) a nitrogen oxides (NOx) oxidation catalyst downstream of and in fluid communication with the SOx oxidation catalyst;
  (d) an absorber/condenser downstream of and in fluid communication with the NOx oxidation catalyst for removing SOx oxidation products as sulfuric acid and/or for removing NOx oxidation products as nitric acid; and
    i. an acid storage tank connected to receive acid removed by the absorber/condenser.

125. A system according to enumerated example embodiment 125 (or any other enumerated example embodiment) further comprising a mist removal stage downstream of and in fluid communication with the absorber/condenser and a stack or funnel downstream of and in fluid communication with the mist removal stage.

126. A system according to enumerated example embodiment 125 (or any other enumerated example embodiment) further comprising a fuel processor and a flow diverting device downstream of and in fluid communication with the fuel processor, wherein the flow diverting device is selectively operable to direct an output of the fuel processor to a first junction upstream of and in fluid communication with the PM removal stage and a second junction upstream of and in fluid communication with the SOx oxidation catalyst and a third junction immediately upstream of and in fluid communication with the NOx oxidation catalyst.

127. A gas treatment system comprising:
  (a) an engine system comprising a compressor or turbocharger, a combustion engine downstream of and in fluid communication with the compressor or turbocharger, a feed (fuel) tank connected to supply fuel to the combustion engine, and an expander or turbine downstream of and in fluid communication with the combustion engine;
  (b) a particulate matter (PM) removal stage downstream of and in fluid communication with the combustion engine;
  (c) a sulfur oxides (SOx) oxidation catalyst downstream of and in fluid communication with the PM removal stage;
  (d) a nitrogen oxides (NOx) oxidation catalyst downstream of and in fluid communication with the expander or turbine;
  (e) an absorber/condenser downstream of and in fluid communication with the NOx oxidation catalyst for removing SOx oxidation products as sulfuric acid and/or for removing NOx oxidation products as nitric acid; and
  (f) an acid storage tank connected to receive acid removed by the absorber/condenser;
  (g) wherein the expander or turbine is downstream of and in fluid communication with the SOx oxidation catalyst.

128. A system according to enumerated example embodiment 128 (or any other enumerated example embodiment) further comprising a mist removal stage downstream of and in fluid communication with the NOx oxidation catalyst.

129. A system according to enumerated example embodiment 128 (or any other enumerated example embodiment) comprising a stack or funnel downstream of and in fluid communication with the mist removal stage.

130. A system according to any one of enumerated example embodiments 128 to 130 (or any other enumerated example embodiment) further comprising a strong acid storage tank downstream of and in fluid communication with the absorber/condenser.

131. A system according to any one of enumerated example embodiments 128 to 131 (or any other enumerated example embodiment) (or any other enumerated example embodiment), further comprising a flow diverting device downstream of and in fluid communication with the PM removal stage, wherein the flow diverting device is operable to recirculate fluid to the combustion engine.

132. A gas treatment system comprising:
  (a) an engine system comprising a compressor or turbocharger, a combustion engine downstream of and in fluid communication with the compressor or turbocharger, a feed (fuel) tank connected to supply fuel to the combustion engine, and an expander or turbine downstream of and in fluid communication with the combustion engine;
  (b) a sulfur oxides (SOx) oxidation catalyst downstream of and in fluid communication with the combustion engine;
  (c) a particulate matter (PM) removal stage downstream of and in fluid communication with the expander or turbine;
  (d) a nitrogen oxides (NOx) oxidation catalyst downstream of and in fluid communication with the PM removal stage;
  (e) an absorber/condenser downstream of and in fluid communication with the NOx oxidation catalyst, the absorber/condenser configured for removing SOx oxidation products as sulfuric acid and/or for removing NOx oxidation products as nitric acid; and
  (f) an acid storage tank connected to receive acid removed by the absorber/condenser;
  (g) wherein the expander or turbine is downstream of and in fluid communication with the SOx oxidation catalyst.

133. A system according to enumerated example embodiment 133 (or any other enumerated example embodiment) further comprising a mist removal stage downstream of and in fluid communication with the NOx oxidation catalyst.

134. A system according to enumerated example embodiment 133 (or any other enumerated example embodiment) comprising a stack or funnel downstream of and in fluid communication with the mist removal stage.

135. A system according to any one of enumerated example embodiments 133 to 135 (or any other enumerated example embodiment) further comprising a strong acid storage tank downstream of and in fluid communication with the absorber/condenser.

136. A gas treatment system comprising:
  (a) an engine system comprising a compressor or turbocharger, a combustion engine downstream of and in fluid communication with the compressor or turbocharger, an expander or turbine downstream of and in fluid communication with the combustion engine, a feed (fuel) tank connected to supply fuel to the combustion engine, and a fuel processor downstream of and in fluid communication with the feed (fuel) tank;
  (b) a particulate matter (PM) removal stage downstream of and in fluid communication with the expander or turbine;
  (c) a sulfur oxides (SOx) oxidation catalyst downstream of and in fluid communication with the PM removal stage;
  (d) a nitrogen oxides (NOx) oxidation catalyst downstream of and in fluid communication with the SOx oxidation catalyst;
  (e) an absorber/condenser downstream of and in fluid communication with the NOx oxidation catalyst for removing SOx oxidation products as sulfuric acid and/or for removing NOx oxidation products as nitric acid.

137. A system according to enumerated example embodiment 137 (or any other enumerated example embodiment) further comprising a mist removal stage downstream of and in fluid communication with the NOx oxidation catalyst.

138. A system according to enumerated example embodiment 137 comprising a stack or funnel downstream of and in fluid communication with the mist removal stage.
139. A system according to any one of enumerated example embodiments 137 to 139 (or any other enumerated example embodiment) comprising a weak acid storage tank downstream of and in fluid communication with the absorber/condenser.
140. A system according to any one of enumerated example embodiments 137 to 140 (or any other enumerated example embodiment) comprising a flow diverting device downstream of and in fluid communication with the fuel processor, wherein the flow diverting device is upstream of and in fluid communication with the PM removal stage, the SOx oxidation catalyst, and the NOx oxidation catalyst.
141. A system according to any one of enumerated example embodiments 137 to 141 (or any other enumerated example embodiment) further comprising a strong acid storage tank downstream of and in fluid communication with the absorber/condenser.
142. A system according to any one of enumerated example embodiments 137 to 142 (or any other enumerated example embodiment) further comprising a supply of a cooling agent and a mixer downstream of and in fluid communication with the supply of cooling agent, wherein the mixer is downstream of and in fluid communication with the SOx oxidation catalyst and upstream of and in fluid communication with the NOx oxidation catalyst.
143. A gas treatment system comprising:
   (a) an engine system comprising a compressor or turbocharger, a combustion engine downstream of and in fluid communication with the compressor or turbocharger, an expander or turbine downstream of and in fluid communication with the combustion engine, a feed (fuel) tank connected to supply fuel to the combustion engine and to a fuel processor;
   (b) a particulate matter (PM) removal stage downstream of and in fluid communication with the expander or turbine;
   (c) a sulfur oxides (SOx) oxidation catalyst downstream of and in fluid communication with the PM removal stage;
   (d) an absorber/condenser downstream and in fluid communication with the SOx oxidation catalyst the absorber/condenser configured for removing SOx oxidation products as sulfuric acid and/or for removing nitrogen oxides (NOx) oxidation products as nitric acid; and
   (e) a flow diverting device downstream of and in fluid communication with the fuel processor, wherein the flow diverting device is selectively operable to direct an output of the fuel processor to a first junction upstream of and in fluid communication with the PM removal stage and a second junction upstream of and in fluid communication with the SOx oxidation catalyst.
144. A system according to enumerated example embodiment 144 (or any other enumerated example embodiment) wherein the flow diverting device is selectively operable to direct the output of the fuel processor to a third junction immediately upstream of and in fluid communication with the NOx oxidation catalyst.
145. A system according to enumerated example embodiment 144 (or any other enumerated example embodiment) further comprising a mist removal stage downstream of and in fluid communication with the NOx oxidation catalyst.
146. A system according to enumerated example embodiment 146 (or any other enumerated example embodiment) comprising a stack or funnel downstream of and in fluid communication with the mist removal stage.
147. A system according to any one of enumerated example embodiments 144 to 147 (or any other enumerated example embodiment) comprising an acid storage tank downstream of and in fluid communication with the absorber/condenser.
148. Apparatus having any new and inventive feature, combination of features, or sub-combination of features as described herein.
149. Methods having any new and inventive steps, acts, combination of steps and/or acts or sub-combination of steps and/or acts as described herein.

Interpretation of Terms

Unless the context clearly requires otherwise, throughout the description and the claims:
   "comprise", "comprising", and the like are to be construed in an inclusive sense, as opposed to an exclusive or exhaustive sense; that is to say, in the sense of "including, but not limited to";
   "connected", "coupled", or any variant thereof, means any connection or coupling, either direct or indirect, between two or more elements; the coupling or connection between the elements can be physical, logical, or a combination thereof;
   "herein", "above", "below", and words of similar import, when used to describe this specification, shall refer to this specification as a whole, and not to any particular portions of this specification;
   "or", in reference to a list of two or more items, covers all of the following interpretations of the word: any of the items in the list, all of the items in the list, and any combination of the items in the list;
   the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a mixer, catalyst, valve, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A gas treatment process comprising:
   (a) removing particulate matter (PM) from a process gas;
   (b) oxidizing sulfur oxides (SOx) in the process gas using a SOx oxidation catalyst;
   (c) absorbing and/or condensing SOx oxidation products as sulfuric acid;
   (d) oxidizing nitrogen oxides (NOx) in the process gas using a NOx oxidation catalyst;
   (e) absorbing and/or condensing NOx oxidation products as nitric acid;
   (f) operating a fuel processor to produce a gas; and
   (g) selectively diverting the gas from the fuel processor to one or more of a first junction upstream of and in fluid communication with a PM removal stage for removing PM from the process gas, a second junction upstream of and in fluid communication with the SOx oxidation catalyst, and a third junction upstream of and in fluid communication with the NOx oxidation catalyst.

2. A gas treatment process according to claim 1, wherein the SOx oxidation catalyst comprises a $V_2O_5$-based catalyst.

3. A gas treatment process according to claim 2, wherein the $V_2O_5$-based catalyst is Cs-promoted.

4. A gas treatment process according to claim 1, wherein the temperature of the process gas entering the SOx oxidation catalyst is in the range of about 370° C. to about 500° C. on a time-weighted average (TWA) basis.

5. A gas treatment process according to claim 4, wherein the temperature of the process gas entering the SOx oxidation catalyst is between about 390° C. to about 450° C. on a TWA basis.

6. A gas treatment process according to claim 1, wherein the SOx oxidation catalyst is located upstream of an expander/turbine.

7. A gas treatment process according to claim 1, wherein the SOx oxidation catalyst is located downstream of an expander/turbine.

8. A gas treatment process according to claim 1, wherein the SOx oxidation catalyst is located between two stages of a two-stage expander/turbine.

9. A gas treatment process according to claim 1, further comprising adding one or more of a heating agent, a hot flue gas, and a hot air stream to the process gas to maintain the temperature of the process gas entering the SOx oxidation catalyst within the range of about 370° C. to about 450° C.

10. A gas treatment process according to claim 1, wherein the SOx oxidation catalyst comprises active components that are coated on a flow-through monolith catalyst.

11. A gas treatment process according to claim 1, wherein the NOx oxidation catalyst comprises a PGM-based catalyst.

12. A gas treatment process according to claim 1, wherein the NOx oxidation catalyst comprises a $V_2O_5$-based SCR catalyst.

13. A gas treatment process according to claim 1, wherein the NOx oxidation catalyst is located downstream of an expander/turbine.

14. A gas treatment process according to claim 1, wherein the temperature of the process gas entering the NOx oxidation catalyst is between about 180° C. and about 450° C.

15. A gas treatment process according to claim 1, wherein the NOx oxidation catalyst is operated under conditions wherein the NOx oxidation catalyst is operable to oxidize SOx.

16. A gas treatment process according to claim 15, wherein the NOx oxidation catalyst is operated to oxidize SOx and the NOx in the absence of ammonia and urea.

17. A gas treatment process according to claim 1, further comprising reducing the temperature of the process gas entering the NOx oxidation catalyst by heat exchange or mixing a trim cooling gas with the process gas stream upstream of the NOx oxidation catalyst.

18. A gas treatment process according to claim 17, wherein the trim cooling gas comprises an oxygen-containing gas.

19. A gas treatment process according to claim 17, wherein the temperature of the process gas entering the NOx oxidation catalyst is between about 200° C. and about 320° C.

20. A gas treatment process according to claim 1, wherein removing PM comprises passing the process gas through one or more particulate filters, and the one or more particulate filters are located downstream of an expander/turbine.

21. A gas treatment process according to claim 1, wherein removing PM comprises passing the process gas through one or more particulate filters, the process further comprising raising the temperature of the process gas entering the one or more particulate filters to a temperature in the range of about 550° C. to about 700° C. to actively regenerate the one or more particular filters.

22. A gas treatment process according to claim 1, wherein removing PM comprises passing the process gas through one or more particulate filters, wherein an axial gas flow velocity of the one or more particulate filters is greater that an expected flame speed of the one or more particulate filters at a local pressure, an oxygen content, and typical regenerating temperatures.

23. A gas treatment process according to claim 1, wherein the SOx oxidation products comprise $SO_3$ and the process comprises absorbing and/or condensing the $SO_3$ as sulfuric acid at a temperature below a dewpoint temperature of sulfuric acid.

24. A gas treatment process according to claim 23, wherein the NOx oxidation products comprise $NO_2$ and the process comprises absorbing and/or condensing the $NO_2$ as nitric acid at a temperature below a dewpoint temperature of nitric acid.

25. A gas treatment process according to claim 24, wherein one or more of the $SO_3$, sulfuric acid, the $NO_2$, and nitric acid are absorbed and/or condensed at a temperature between about 0° C. and about 70° C.

26. A gas treatment process according to claim 1, wherein absorbing and/or condensing the SOx oxidation products comprises using a recirculated acid spray contactor.

27. A gas treatment process according to claim 26, wherein absorbing and/or condensing the NOx oxidation products comprises using the recirculated acid spray contactor.

28. A gas treatment process according to claim 1, further comprising recycling gas substantially free of PM to an engine.

29. A gas treatment process according to claim 1, wherein the sulfuric acid comprises about 90 wt. % to about 98.5 wt. % sulfuric acid.

30. A gas treatment process according to claim 1, further comprising removing acid droplets entrained from the absorber and/or condenser using a demister.

31. A gas treatment process according to claim 1, wherein oxidizing NOx occurs at a pressure that is less than a pressure used to oxidize SOx.

32. A gas treatment process according to claim 1, wherein oxidizing NOx occurs at a temperature that is less than a temperature used to oxidize SOx.

33. A process according to claim 1 comprising, after oxidizing the sulfur oxides (SOx) in the process gas using the SOx oxidation catalyst, absorbing and/or condensing SOx under first temperature conditions and after oxidizing the NOx in the process gas using the NOx oxidation catalyst absorbing and/or condensing nitric acid under second temperature conditions wherein the second temperature conditions are lower in temperature than the first temperature conditions.

34. A gas treatment process according to claim 33 wherein the first temperature conditions are temperatures lower than a dewpoint temperature of sulfuric acid in the process gas and the second temperature conditions are temperatures lower than a dewpoint temperature of nitric acid in the process gas.

35. A gas treatment process according to claim 33 wherein the first temperature conditions are temperatures in the range of about 100° C. to about 220° C. and the second temperature conditions are temperatures in the range of about 0° C. to about 70° C.

36. A gas treatment process according to claim 1 further comprising adding one or more of a heating agent, a hot flue gas, and a hot air stream to the process gas to maintain the temperature of the process gas entering the SOx oxidation catalyst within the range of about 370° C. to about 450° C., wherein the heating agent comprises a combustible gas and the combustible gas comprises one or more of syngas, reformate from an onboard fuel processor, vaporized diesel fuel, and a partially-oxidized fuel.

37. A gas treatment process according to claim 1 further comprising and alternately adding a heating agent and a reducing agent to the NOx oxidation catalyst to raise a monolith temperature of the catalyst to a preset level and intermittently desulfate the NOx oxidation catalyst.

38. A gas treatment process according to claim 1 wherein removing PM comprises passing the process gas through one or more particulate filters, the one or more particulate filters comprise a catalytic filter with platinum-group metal (PGM) loading, the process further comprising operating the one or more particulate filters at a TWA process gas temperature that is above a soot balancing temperature of the catalytic filter.

39. A gas treatment process comprising:
(a) removing particulate matter (PM) from a process gas;
(b) oxidizing sulfur oxides (SOx) in the process gas using a SOx oxidation catalyst;
(c) absorbing and/or condensing SOx oxidation products as sulfuric acid;
(d) adding one or more of a heating agent, a hot flue gas, and a hot air stream to the process gas to maintain the temperature of the process gas entering the SOx oxidation catalyst within the range of about 370° C. to about 450° C.,
wherein the heating agent comprises a combustible gas and the combustible gas comprises one or more of syngas, reformate from an onboard fuel processor, vaporized diesel fuel, and a partially-oxidized fuel.

40. A gas treatment process according to claim 39 further comprising oxidizing nitrogen oxides (NOx) in the process gas using a NOx oxidation catalyst and alternately adding a heating agent and a reducing agent to the NOx oxidation catalyst to raise a monolith temperature of the catalyst to a preset level and intermittently desulfate the NOx oxidation catalyst.

41. A gas treatment process according to claim 39 wherein removing PM comprises passing the process gas through one or more particulate filters, the one or more particulate filters comprise a catalytic filter with platinum-group metal (PGM) loading, the process further comprising operating the one or more particulate filters at a TWA process gas temperature that is above a soot balancing temperature of the catalytic filter.

42. A gas treatment process according to claim 39 further comprising oxidizing NOx in the process gas using a NOx oxidation catalyst, operating a fuel processor to produce a gas, and selectively diverting the gas from the fuel processor to one or more of a first junction upstream of and in fluid communication with a PM removal stage for removing PM from the process gas, a second junction upstream of and in fluid communication with the SOx oxidation catalyst, and a third junction immediately upstream of and in fluid communication with the NOx oxidation catalyst.

43. A gas treatment process comprising:
(a) removing particulate matter (PM) from a process gas;
(b) oxidizing sulfur oxides (SOx) in the process gas using a SOx oxidation catalyst;
(c) absorbing and/or condensing SOx oxidation products as sulfuric acid;
(d) oxidizing nitrogen oxides (NOx) in the process gas using a NOx oxidation catalyst;
(e) alternately adding a heating agent and a reducing agent to the NOx oxidation catalyst to raise a monolith temperature of the catalyst to a preset level and intermittently desulfate the NOx oxidation catalyst.

44. A gas treatment process according to claim 43 further comprising adding one or more of a heating agent, a hot flue gas, and a hot air stream to the process gas to maintain the temperature of the process gas entering the SOx oxidation catalyst within the range of about 370° C. to about 450° C., wherein the heating agent comprises a combustible gas and the combustible gas comprises one or more of syngas, reformate from an onboard fuel processor, vaporized diesel fuel, and a partially-oxidized fuel.

45. A gas treatment process according to claim 43 wherein removing PM comprises passing the process gas through one or more particulate filters, the one or more particulate filters comprise a catalytic filter with platinum-group metal (PGM) loading, the process further comprising operating the one or more particulate filters at a TWA process gas temperature that is above a soot balancing temperature of the catalytic filter.

46. A gas treatment process according to claim 43 further comprising operating a fuel processor to produce a gas and selectively diverting the gas from the fuel processor to one or more of a first junction upstream of and in fluid communication with a PM removal stage for removing PM from the process gas, a second junction upstream of and in fluid communication with the SOx oxidation catalyst, and a third junction immediately upstream of and in fluid communication with the NOx oxidation catalyst.

47. A gas treatment process comprising:
(a) removing particulate matter (PM) from a process gas;
(b) oxidizing sulfur oxides (SOx) in the process gas using a SOx oxidation catalyst;
(c) absorbing and/or condensing SOx oxidation products as sulfuric acid,
wherein removing PM comprises passing the process gas through one or more particulate filters, the one or more particulate filters comprise a catalytic filter with platinum-group metal (PGM) loading, the process further comprising operating the one or more particulate filters at a TWA process gas temperature that is above a soot balancing temperature of the catalytic filter.

48. A gas treatment process according to claim 47 further comprising adding one or more of a heating agent, a hot flue gas, and a hot air stream to the process gas to maintain the temperature of the process gas entering the SOx oxidation catalyst within the range of about 370° C. to about 450° C., wherein the heating agent comprises a combustible gas and the combustible gas comprises one or more of syngas, reformate from an onboard fuel processor, vaporized diesel fuel, and a partially-oxidized fuel.

49. A gas treatment process according to claim 47 further comprising oxidizing nitrogen oxides (NOx) in the process gas using a NOx oxidation catalyst and alternately adding a heating agent and a reducing agent to the NOx oxidation catalyst to raise a monolith temperature of the catalyst to a preset level and intermittently desulfate the NOx oxidation catalyst.

50. A gas treatment process according to claim 47 further comprising oxidizing nitrogen oxides (NOx) in the process gas using a NOx oxidation catalyst, operating a fuel processor to produce a gas, and selectively diverting the gas from the fuel processor to one or more of a first junction upstream of and in fluid communication with a PM removal stage for removing PM from the process gas, a second junction upstream of and in fluid communication with the SOx oxidation catalyst, and a third junction immediately upstream of and in fluid communication with the NOx oxidation catalyst.

51. A gas treatment system comprising:
(a) a particulate matter (PM) removal stage;
(b) a sulfur oxides (SOx) oxidation catalyst downstream of and in fluid communication with the PM removal stage;
(c) a nitrogen oxides (NOx) oxidation catalyst downstream of and in fluid communication with the SOx oxidation catalyst;
(d) an absorber/condenser downstream of and in fluid communication with the NOx oxidation catalyst for removing SOx oxidation products as sulfuric acid and/or for removing NOx oxidation products as nitric acid; and
(e) a fuel processor and a flow diverting device downstream of and in fluid communication with the fuel processor, wherein the flow diverting device is selectively operable to direct an output of the fuel processor to a first junction upstream of and in fluid communication with the PM removal stage and a second junction upstream of and in fluid communication with the SOx oxidation catalyst and a third junction immediately upstream of and in fluid communication with the NOx oxidation catalyst.

52. A gas treatment system according to claim 51 wherein the fuel processor is selectively operable to supply one or more of a heating agent, a hot flue gas, and a hot air stream to the process gas to maintain the temperature of the process gas entering the SOx oxidation catalyst within the range of about 370° C. to about 450° C., wherein the heating agent comprises a combustible gas and the combustible gas comprises one or more of syngas, reformate from an onboard fuel processor, vaporized diesel fuel, and a partially-oxidized fuel.

53. A gas treatment system according to claim 51 wherein the PM removal stage comprises one or more particulate filters, the one or more particulate filters comprising a catalytic filter with platinum-group metal (PGM) loading operable at a TWA process gas temperature that is above a soot balancing temperature of the catalytic filter.

54. A gas treatment system according to claim 51 further comprising a supply of a heating agent and a reducing agent upstream of and in fluid communication with the NOx oxidation catalyst and a flow diverting device downstream of and in fluid communication with the supply of the heating agent and the reducing agent, wherein the flow diverting device is selectively operable to direct the supply of the heating agent and the reducing agent to the NOx oxidation catalyst.

* * * * *